(12) United States Patent
Komori

(10) Patent No.: US 11,976,966 B1
(45) Date of Patent: May 7, 2024

(54) LIGHT REDUCTION MECHANISM, OUTPUT DATA CORRECTION METHOD, AND LASER BEAM MEASUREMENT DEVICE

(71) Applicant: Tamron Co., Ltd., Saitama (JP)

(72) Inventor: Kazunori Komori, Saitama (JP)

(73) Assignee: Tamron Co., Ltd., Saitama (JP)

( * ) Notice: Subject to any disclaimer, the term of this patent is extended or adjusted under 35 U.S.C. 154(b) by 0 days.

(21) Appl. No.: 18/502,614

(22) Filed: Nov. 6, 2023

(30) Foreign Application Priority Data

Nov. 29, 2022 (JP) .................. 2022-189981

(51) Int. Cl.
*G01J 1/42* (2006.01)
*G01J 1/04* (2006.01)
*G02B 27/14* (2006.01)

(52) U.S. Cl.
CPC ........... *G01J 1/4257* (2013.01); *G01J 1/0411* (2013.01); *G02B 27/145* (2013.01)

(58) Field of Classification Search
CPC ...... G01J 1/0411; G01J 1/0414; G01J 1/4257; G02B 27/145; G02B 27/149
See application file for complete search history.

(56) References Cited

U.S. PATENT DOCUMENTS 7,001,375 B2 * 2/2006 Yee .................... B23K 26/705
606/4
2020/0209058 A1 7/2020 Tsunekane

FOREIGN PATENT DOCUMENTS

WO WO 2019/021435 A1 1/2019

* cited by examiner

*Primary Examiner* — Kevin K Pyo
(74) *Attorney, Agent, or Firm* — Paratus Law Group, PLLC

(57) ABSTRACT

Provided is a light reduction mechanism which includes a plate-type first beam splitter and a plate-type second beam splitter, in which in a case where the X axis and the Y axis are arbitrary orthogonal coordinate axes in the plane perpendicular to the optical axis of laser beam irradiation optical unit whose origin is in the optical axis, the first beam splitter is arranged with the X axis as a rotation axis and inclined at an angle α in the range from 30° to 60° inclusive with respect to the plane perpendicular to the optical axis, and the second beam splitter is arranged with the X' axis, which is parallel to the X axis and passes through the optical axis, as a rotation axis, and inclined at an angle -α with respect to the plane perpendicular to the optical axis.

9 Claims, 8 Drawing Sheets

X AXIS DIRECTION

Y AXIS DIRECTION

X AXIS DIRECTION

Y AXIS DIRECTION

FIG. 15A
X AXIS DIRECTION
FIG. 15B
Y AXIS DIRECTION
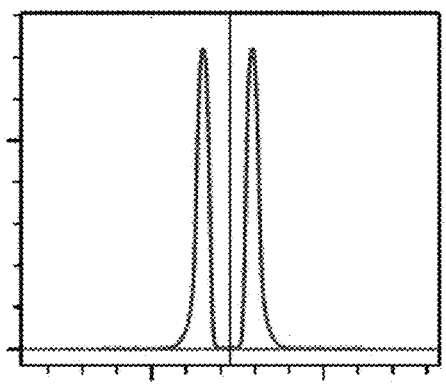
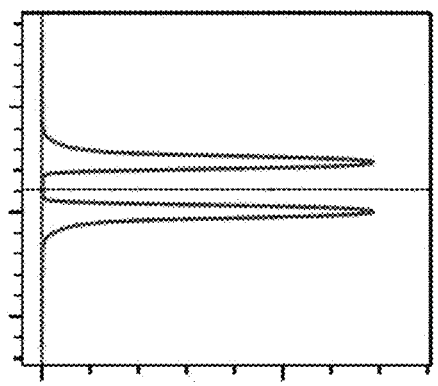
FIG. 16
FIG. 17A
X AXIS DIRECTION
FIG. 17B
Y AXIS DIRECTION
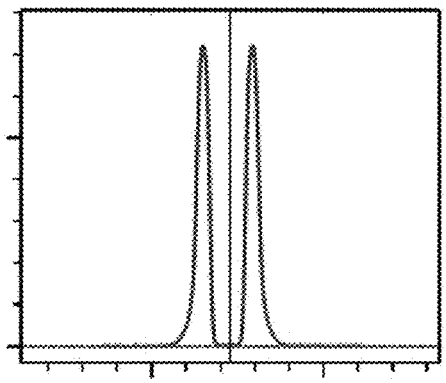
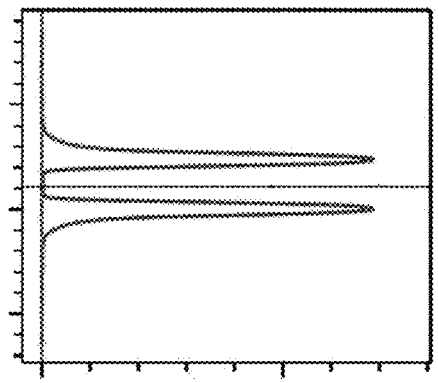
FIG. 18

FIG. 19A
X AXIS DIRECTION
FIG. 19B
Y AXIS DIRECTION
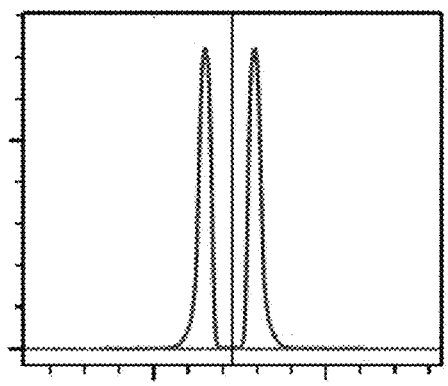
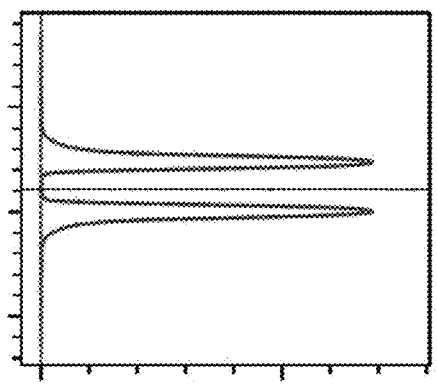
FIG. 20
FIG. 21A
X AXIS DIRECTION
FIG. 21B
Y AXIS DIRECTION
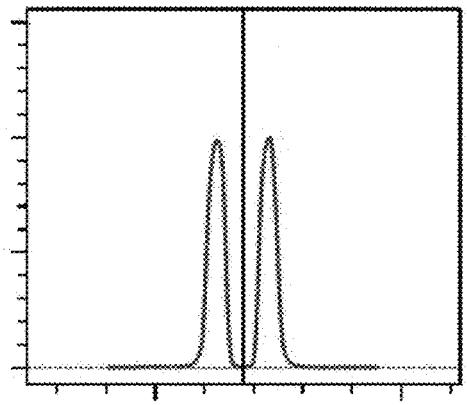
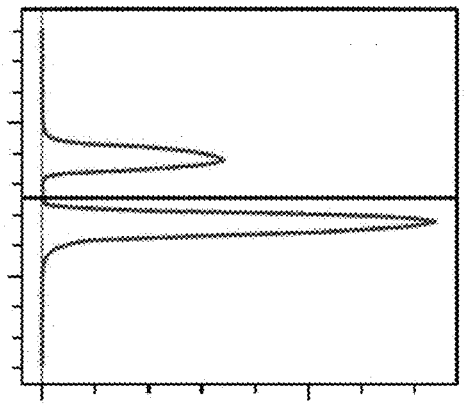
FIG. 22

ical Field

The present invention relates to a light reduction mechanism, an output data correction method, and a laser beam measurement device that reduce a laser beam irradiated from a laser beam irradiation optical unit for laser processing by irradiating the laser beam to form a spot on a workpiece to be processed.

Related Art

A laser beam has been widely used for processing various products in recent years. The laser beam is collected to a single point on a workpiece to irradiate the workpiece, so that the surface temperature of the workpiece rises rapidly and the irradiated surface of the workpiece is melted or evaporated. Laser processing devices that use the laser beam apply processing such as cutting, drilling, and welding to the workpiece in this way. Since the laser beam is collected to a single point, precise and fine processing at a pinpoint is possible. The use of a higher-energy laser beam can also reduce processing time and enable processing of hardened workpieces that are difficult to process with a blade.

Here, the laser processing device has a laser beam irradiation optical unit. The laser beam irradiation optical unit has been conventionally employed with a function of collecting the laser beam to a single point of a spot or irradiating a laser beam having a circular image shape at the spot which has a Gaussian or top-hat energy intensity distribution. However, in laser processing that employs the conventional spot image shape, when cutting, welding, or drilling a workpiece, the workpiece melted by the laser beam leaves residues on the cut surface or in the hole, resulting in deterioration of the processing quality. In recent years, a laser processing has been proposed in which the image shape of the laser beam at the spot is an annular shape so that the molten workpiece is appropriately dispersed and does not leave residues on the cut surface or in the hole.

In this way, the image shape of the laser beam at the spot and the energy intensity distribution in the image shape have changed from a circular shape, Gaussian shape to an annular image shape, or the like, depending on the processing conditions, such as welding or cutting of the workpiece, in order to perform the laser processing. In this case, a laser beam measurement device is used to confirm that the image shape of the laser beam at the spot and the energy intensity distribution in the image shape are in accordance with the desired specifications before laser processing. As a method for reducing the laser beam in the laser beam measurement device, there are known methods, for example, a method in which the laser beam is reduced by a filter and observed by an image sensor such as CCD or CMOS, a method in which the transmitted light intensity is measured while shading a part of the laser beam with a pinhole, slit, or knife-edge, and the transmitted light intensity is calculated from the correlation between the shading position and the transmitted light intensity, a method in which a rod with a small mirror at the tip or a light guide rod with a small hole at the tip is scanned secondarily within the laser beam to measure the intensity distribution, and a method in which the laser beam is irradiated onto a plate that scatters the laser beam, and the image of the scattered light is captured by a camera from behind.

However, the above methods have problems such as filters being deformed by the heat of the laser beam, pinholes, slits, and knife edges damaging the image shape of the laser beam, small mirrors making it difficult to measure tiny image shapes, and blurring the image when using the scattered light. Therefore, in the WO 2019/021435 A1, a method is disclosed in which the laser beam is irradiated onto a fluorescent plate and the intensity distribution of the fluorescence emitted therefrom is measured using a camera or an image sensor.

Such a method, in which the laser beam is irradiated onto a fluorescent plate and the intensity distribution of the fluorescence emitted therefrom is measured using a camera or an image sensor, is as follows. The fluorescent plate absorbs photons from the incident laser beam, thereby electronically exciting molecules of the fluorescent plate, and when the excited molecules return to a ground state, they emit photons having a lower energy corresponding to a longer wavelength than the absorbed photons. The longer wavelength photons are the fluorescence corresponding to the incident laser beam, and the energy of the fluorescence is lower than the energy of the incident laser beam. Since the wavelength of the laser beam and the wavelength of the fluorescence are different, a light separating element (prism or mirror) for separating light having different wavelengths is used to separate the laser beam and the fluorescence. The energy intensity distribution of the laser beam is confirmed by measuring the intensity distribution of the fluorescence.

However, in the method using the fluorescent plate, the thickness of the fluorescent plate should be reduced, otherwise the image produced by the fluorescence becomes blurred. Therefore, in WO 2019/021435 A1, the thickness of the fluorescent plate is made to be 0.2 mm. The method using the fluorescent plate requires the fluorescent plate to be thin, but this makes it impossible to correctly measure the image shape and intensity distribution of the laser beam because the fluorescent plate is damaged by heat or the fluorescent energy intensity is saturated when the energy intensity of the incident laser beam is, for example, 100 W or higher.

The present invention is made in view of the above circumstances. An object of the present invention is to provide a light reduction mechanism, an output data correction method, and a laser beam measurement device that reduce the laser beam irradiated from a laser beam irradiation optical unit to an extent not to damage a device that acquires image data, such as an image sensor or camera, and can measure the image shape and the energy intensity distribution of the laser beam at the spot when the energy intensity of the incident laser beam is high.

SUMMARY OF THE INVENTION

In order to solve the aforementioned problem, the following light reduction mechanism, output data correction method, and laser beam measurement device are arrived at as a result of intensive studies.

The light reduction mechanism according to the present invention is a light reduction mechanism that reduces a laser beam irradiated from a laser beam irradiation optical unit for laser processing by irradiating the laser beam to form a spot on a workpiece to be processed, and includes a plate-type first beam splitter and a second beam splitter, in which in a case where an X axis and a Y axis are arbitrary orthogonal coordinate axes in a plane perpendicular to an optical axis of the laser beam irradiation optical unit whose origin is in the optical axis, the first beam splitter is arranged with the X axis as a rotation axis and inclined at an angle α in a range from 30° to 60° inclusive with respect to a plane perpendicular to the optical axis, and the second beam splitter is arranged with an X' axis, which is parallel to the X axis and passes through the optical axis, as a rotation axis, and inclined at an angle −α with respect to a plane perpendicular to the optical axis.

The output data correction method according to the present invention is an output data correction method, in which the light reduction mechanism includes an observation device that reads information on an energy intensity distribution of the laser beam that forms an image at the position of the spot and a calculation device that performs a numerical calculation of output data from the observation device for correction, the output data correction method having a step of performing a correction by numerically calculating the output data from the light reduction mechanism and a step of performing a numerical calculation to correct a coordinate position of the output data in a Y axis direction.

The laser beam measurement device according to the present invention employs a laser beam measurement device having the aforementioned light reduction mechanism.

Advantageous Effects of the Invention

The light reduction mechanism that reduces the laser beam irradiated from a laser beam irradiation optical unit according to the present invention can reduce the laser beam to an extent not to damage a device that acquires image data, such as an image sensor or camera, and can measure the image shape and the energy intensity distribution of the laser beam at the spot when the energy intensity of the incident laser beam is high. The output data correction method according to the present invention can correct the image shape of the output data to an appropriate image shape. The laser beam measurement device according to the present invention can measure the image shape and the energy intensity distribution of the laser beam at the spot when the energy intensity of the laser beam is high.

BRIEF DESCRIPTION OF THE DRAWINGS

FIG. 15 shows results of measuring the energy intensity distribution in the image at the spot in Example J3;

FIG. 16 shows results of the image shape at the spot in Example 3;

FIG. 17 shows results of measuring the energy intensity distribution in the image at the spot in Example 4;

FIG. 18 shows results of the image shape at the spot in Example 4;

FIG. 19 shows results of measuring the energy intensity distribution in the image at the spot in Example 5;

FIG. 20 shows results of the image shape at the spot in Example 5;

FIG. 21 shows results of measuring the energy intensity distribution in the image at the spot in a comparative example; and FIG. 22 shows results of the image shape at the spot in the comparative example.

DESCRIPTION OF THE EMBODIMENTS

Figure 1:
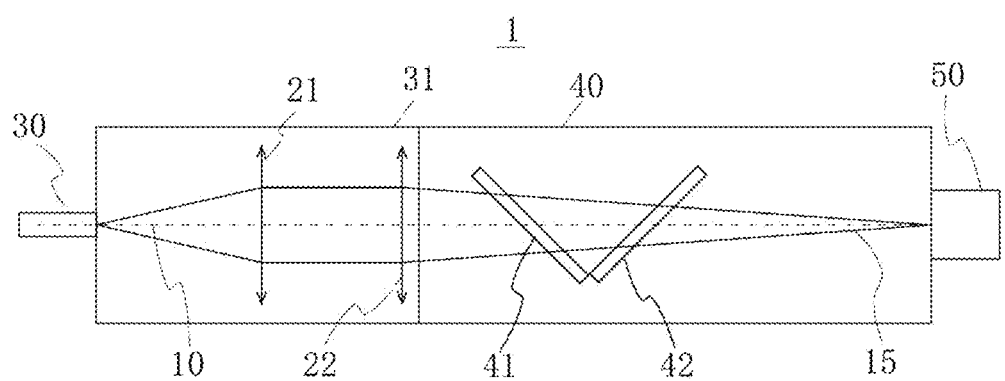
FIG. 1 is a schematic diagram of the light reduction mechanism of a first embodiment.

Embodiments of the light reduction mechanism, the output data correction method, and the laser beam measurement device that reduce the laser beam irradiated from a laser beam irradiation optical unit according to the present invention will be described below. Note that the following description is merely one aspect and is not intended to limit the interpretation of the following description.

1. Embodiment of the Light Reduction Mechanism that Reduces the Laser Beam Irradiated from a Laser Beam Irradiation Optical Unit The light reduction mechanism according to the present invention is a light reduction mechanism that reduces the laser beam irradiated from a laser beam irradiation optical unit for laser processing by irradiating the laser beam to form a spot on a workpiece to be processed. This light reduction mechanism is used to reduce the light of the laser beam and then to make the laser beam enter an observation device so that the high energy of the laser beam does not damage the observation device when the observation device is used to measure the image shape of the laser beam and the energy intensity distribution of the laser beam at the spot. In other words, the light reduction mechanism according to the present invention is an optical system that reduces the energy intensity of the laser beam incident to the light reduction mechanism and outputs the laser beam from the light reduction mechanism.

The laser beam irradiation optical unit is an optical system necessary for laser processing, the optical system irradiating a laser beam and collecting the laser beam to a spot to form a desired image shape of the laser beam and a desired energy intensity distribution of the laser beam at the spot. The light reduction mechanism according to the present invention is attached between the laser beam irradiation optical unit and the spot and reduces the laser beam irradiated from the laser beam irradiation optical unit for measuring the image shape of the laser beam and the energy intensity distribution of the laser beam at the spot. After measuring the image shape of the laser beam and the energy intensity distribution of the laser beam at the spot, the image shape of the laser beam and the energy intensity distribution of the laser beam at the spot are adjusted and measured again as necessary, and then the light reduction mechanism can be removed from the laser beam irradiation optical unit. The workpiece to be processed can then be placed at the spot location and laser processing can be performed. It is also possible to branch the laser beam in the laser beam irradiation optical unit and use it as a light reduction mechanism for the laser beam to observe the image shape and energy intensity distribution of the laser beam during laser processing. Note that the light reduction mechanism can be covered with a lens barrel or the like to prevent the laser beam from leaking out from the light reduction mechanism.

Note that the laser beam irradiation optical unit according to the present invention may include any optical system as long as laser processing can be performed. For example, a galvano optical system with a galvanometer mirror may be included.

FIG. 1 shows the arrangement configuration of the light reduction mechanism of the first embodiment 1 of the light reduction mechanism according to the present invention and the abbreviated irradiation trajectory of the laser beam. In the first embodiment 1 of the light reduction mechanism, an optical fiber 30 for guiding and emitting a laser beam output from a laser oscillator (not shown), a collimation lens 21 for collimating the laser beam diffusely output from the output end of the optical fiber 30, a collective lens 22 for collecting the laser beam collimated by the collimation lens 21 onto a spot on the surface of the workpiece to be processed, a light reduction mechanism 40 to reduce the laser beam, an observation device 50 for observing light to confirm the image shape and the intensity distribution of the laser beam at the spot, are arranged along the optical axis 10 of the irradiation trajectory of the laser beam irradiation optical unit 31, in order from the laser oscillator side. The positions of the optical center of the collimation lens 21 and the optical center of the collective lens 22 are aligned with the optical axis 10 and located in the laser beam irradiation optical unit 31. The laser beam converges and forms an image on the spot at the trajectory shown in the irradiation trajectory 15.

The laser beam incident from the laser oscillator to the laser beam irradiation optical unit 31 via the optical fiber 30 can be any laser beam as long as it can be used for laser processing. In particular, it is preferred to be a near-infrared laser beam with an oscillation wavelength of about 920 nm to 1080 nm inclusive, represented by a YAG laser (wavelength: 1064 nm), a fiber laser (wavelength: 1070 nm), a disk laser (wavelength: 1030 nm), or a semiconductor laser (wavelength: 935 nm, 940 nm, 980 nm, 940 to 980 nm, 940 to 1025 nm). A laser beam in the blue, green, or ultraviolet region can be used as long as it can be used for laser processing. The energy distribution in the plane perpendicular to the optical axis 10 of the laser beam incident to the laser beam irradiation optical unit 31 may be Gaussian with stronger energy in the center portion (optical axis portion) or uniform.

In FIG. 1, the collimation lens 21 and the collective lens 22 are mounted in the laser beam irradiation optical unit 31 in such a manner that their respective optical centers are aligned with the optical axis 10. In other words, optical systems necessary for laser processing are arranged in the laser beam irradiation optical unit 31. The laser beam irradiation optical unit 31 is connected to the light reduction mechanism 40, and the light reduction mechanism 40 is connected to the observation device 50. In this case, the light reduction mechanism 40 may be configured to be covered by a lens barrel or the like to prevent the laser beam from leaking out from the light reduction mechanism 40. The light reduction mechanism 40 may have a configuration detachable from the laser beam irradiation optical unit 31. By connecting the detachable light reduction mechanism 40, to which the observation device 50 can be connected, to the laser beam irradiation optical unit 31, which constitutes the optical axis 10 of the laser beam irradiation trajectory 15, the image shape of the laser beam and the energy intensity distribution of the laser beam at the spot can be measured. After the image shape and the intensity distribution of the laser beam at the spot are adjusted desirably through the measurement with the observation device 50, the light reduction mechanism 40 and the observation device 50 are removed, and the surface of the workpiece to be processed is positioned where the imaging face of the observation device 50 was located, so that laser processing can be performed with high accuracy.

The image shape of the laser beam at the spot can be any image shape as long as the workpiece to be processed can be processed by the laser beam. For example, at least one of the collimation lens 21 and the collective lens 22 of the laser beam irradiation optical unit 31 can have a function of converting the image shape of the laser beam at the spot into an annular shape consisting of at least an annular peripheral region (hereinafter referred to as the annular shape conversion function in the present description). The shape of the energy distribution at the spot is made to be an annular shape consisting of at least an annular peripheral region, so that the energy of the laser beam is uniformly irradiated from the center region of the spot to all directions on the surface of the workpiece to be processed. This allows the zinc gases to escape and clean welds to be made in the overlay welding of molten zinc steel sheets.

The shape at the spot by the annular shape conversion function is not particularly limited. For example, the shape may consist of an annular shape and a point shape at the center portion of the annular shape (the point portion is a Gaussian shape), or the shape may be a top-hat shape, or the like. In this case, the energy intensity at the spot of the point shape at the center portion of the annular shape is preferred to be higher than the energy intensity in the annular shape portion. In the case of a metal such as aluminum, which has high light reflectivity, the metal can be melted in the annular shape portion having low energy intensity to reduce reflectivity, and the workpiece to be processed can be deeply melted in the central portion having high energy intensity, thereby making the laser processing easier.

In order to form the image shape at the spot, at least one of the optical effective surfaces of an optical element having the annular shape conversion function is preferably a diffractive lens, an axicon lens, or an aspheric lens. This is because the spot shape of the laser beam can be made to be an annular shape, or a shape consisting of an annular shape and a point shape at the center portion of the annular shape.

The laser beam irradiation optical unit 31 is not necessarily to have the annular shape conversion function, and may use a laser beam in which the image shape of the laser beam emitted from the optical fiber 30 is at least an annular shape consisting of the annular peripheral region.

The laser beam irradiation optical unit 31 may have a laser beam direction adjustment mechanism consisting of a connector portion to which the optical fiber 30 is connected and a connector receiving portion that fixes the connector portion to the optical axis 10 of the irradiation trajectory. The laser beam direction adjustment mechanism adjusts the incident direction of the laser beam into the irradiation trajectory by causing at least one of the connector portion and the connector receiving portion to swivel in a circular arc with the center portion of the core of the optical fiber 30 at the laser beam output end as the center point. The laser beam output from the laser oscillator is guided to the laser processing head of the laser processing device by means of the optical fiber 30. The emission direction of the laser beam output from the output end of the optical fiber 30 has a certain range of inclination to the optical axis 10. Specifically, for example, in the CW fiber laser from Wuhan Raycus Fiber Laser Technologies Co., Ltd, the angle of the optical axis of the laser beam output from the output end of the optical fiber with respect to the reference optical axis determined by the structural part of the output end of the optical fiber and the structure of the connector is considered to be equal to or less than 30 mrad (milliradians). The laser beam direction adjustment mechanism can be used when the emission direction of the laser beam output from the output end of the optical fiber 30 has a certain range of inclination with respect to the optical axis 10 so that the incident direction of the laser beam into the irradiation trajectory can be adjusted.

The first embodiment 1 of the light reduction mechanism is also preferably to have a calculation device for numerical calculation to correct the output data output from the observation device 50 that is arranged at the spot position and reads the information of the energy intensity distribution of the laser beam at the spot. Based on the optical information from the collimation lens 21 and collective lens 22 arranged in the laser beam irradiation optical unit 31, the first beam splitter 41 and the second beam splitter 42 arranged in the light reduction mechanism 40, focal length data is obtained in advance by means of light ray tracing calculations, or the like, so that the calculation device can perform the numerical calculation to correct the coordinate position of the output data output from the observation device 50. Specific correction methods for correcting the coordinate position of the output data are described below.

Note that although the laser beam irradiation optical unit 31 is configured to have the collimation lens 21 and the collective lens 22, any configuration is acceptable as long as laser processing can be performed, for example, the collective lens 22 alone may be used.

First Embodiment of Light Reduction Mechanism

The first embodiment of the light reduction mechanism according to the present invention is a configuration of the light reduction mechanism 40 shown in FIG. 1, and includes a plate-type first beam splitter 41 and a second beam splitter 42 near the spot side (observation device 50 side) than the laser beam irradiation optical unit 31. The first beam splitter 41 and the second beam splitter 42 may be arranged in such a manner that the center positions of the first beam splitter 41 and the second beam splitter 42 are aligned with the optical axis 10, or at least in such a manner that the irradiation trajectory 15 of the laser beam is within the optical effective plane of the first beam splitter 41 and the second beam splitter 42. In a case where the X axis and the Y axis are arbitrary orthogonal coordinate axes in the plane perpendicular to the optical axis 10 whose origin is in the optical axis 10, the first beam splitter 41 is arranged with the X axis as a rotation axis and inclined at an angle α in the range from 30° to 60° inclusive with respect to the plane perpendicular to the optical axis 10, and the second beam splitter 42 is arranged with the X' axis, which is parallel to the X axis and passes through the optical axis 10, as the rotation axis, and inclined at an angle $-\alpha$ with respect to the plane perpendicular to the optical axis 10. Note that the plane perpendicular to the optical axis 10 in FIG. 1 is the plane perpendicular to the optical axis 10 that includes only one point on the optical axis 10, the X axis is a straight line on the plane perpendicular to the optical axis 10 described above that vertically penetrates the plane when the diagram in FIG. 1 is viewed as a plane with the optical axis 10 as the origin, and the Y axis is a straight line on the plane perpendicular to the optical axis 10 described above that is orthogonal to the X axis in the plane when the diagram in FIG. 1 is viewed as a plane with the optical axis 10 as the origin. In the present invention, X axis and Y axis are defined in the same manner as above in the other diagrams.

The first beam splitter 41 and the second beam splitter 42 have a function of separating an incident laser beam into transmitted light and reflected light. Note that in FIG. 1, the irradiation trajectory 15 of the laser beam indicates the trajectory of the laser beam incident to the first beam splitter 41 and the second beam splitter 42 and the trajectory of the transmitted light transmitting through the first beam splitter 41 and the second beam splitter 42, and the trajectory of the reflected light reflected from the first beam splitter 41 and the second beam splitter 42 is omitted from the diagram. In this case, it is preferable that the first beam splitter 41 and the second beam splitter 42 have a laser beam transmittivity of 0.1% or more and 5.0% or less at an incident angle of 45° of the laser beam to the beam splitter with respect to the optical planes of the beam splitters. This is because the energy intensity of the transmitted light component of the laser beam decreases as compared to the incident laser beam. It is preferable that the first beam splitter 41 and the second beam splitter 42 have the same change characteristic of the "transmittivity at an incident angle other than 45°" of the laser beam to the beam splitter with respect to the optical planes of the beam splitters of the first beam splitter 41 and the second beam splitter 42 as compared with the case of the "transmittivity at 45°". Note that unnecessary reflected light reflected from the first beam splitter 41 and the second beam splitter 42 can be absorbed and released by irradiating the unnecessary reflected light onto a copper plate with a black surface that can easily absorb the laser beam.

Note that the thicknesses of the first beam splitter 41 and the second beam splitter 42 are not particularly limited as long as they can be used for the light reduction mechanism, and the thicknesses of the first beam splitter 41 and the second beam splitter 42 can be the same or different.

Figure 3:
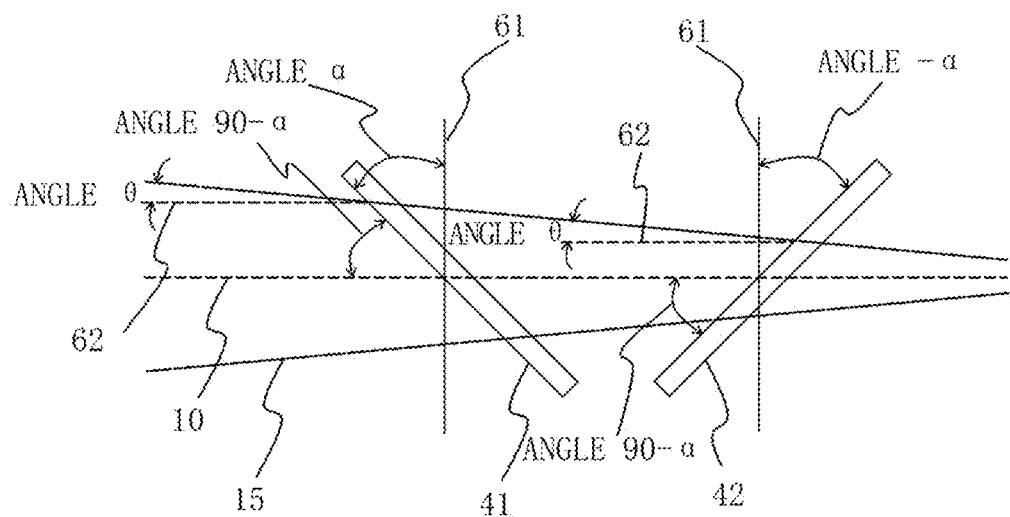
FIG. 3 is an enlarged view of a first beam splitter and a second beam splitter.

In a plate-type beam splitter, the transmitted light shifts with respect to the optical axis 10 due to refraction (the shift of the transmitted light is not shown in FIGS. 1 and 3). However, since the light reduction mechanism is used to measure the energy intensity distribution of the laser beam and the image shape of the laser beam with the observation device 50, the shift of the transmitted light with respect to the optical axis 10 is not a problem.

Figure 2:
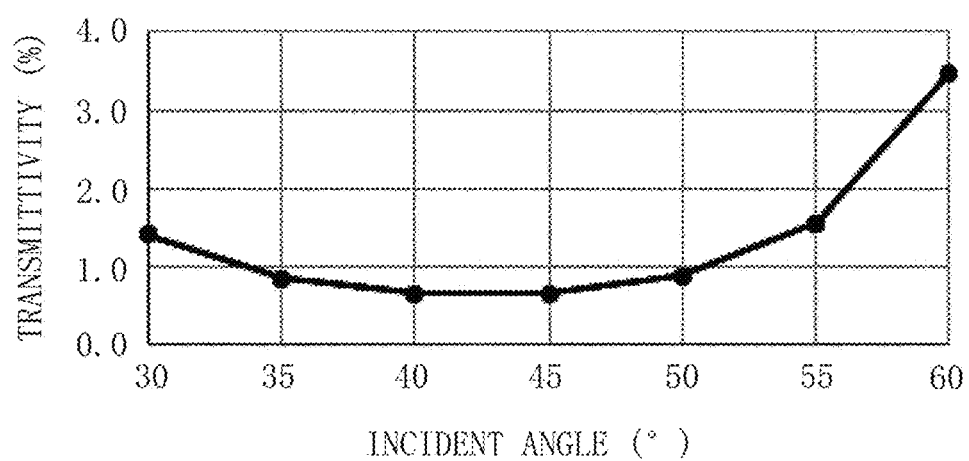
FIG. 2 is an example of the transmittivity characteristics of the beam splitter with respect to the incident angle.

The beam splitter is usually designed to have a specified transmittivity or reflectivity at an incident angle of 45° to the beam splitter with respect to the optical plane of the beam splitter. When the incident angle of the laser beam to the beam splitter changes continuously from 45° to different values, the transmittivity value of the beam splitter changes continuously to different values. FIG. 2 shows an example design of transmittivity with respect to the incident angle to a beam splitter that uses a 19-layer optical thin film to reduce the incident angle dependence of transmittivity. The horizontal axis shows the incident angle (°) of the laser beam to the beam splitter, and the vertical axis shows the transmittivity (%) of the laser beam. Here, the transmittivity at incident angle 40° is 0.75% and the transmittivity at incident angle 50° is 0.92%. In FIG. 1, as shown in irradiation trajectory 15, since the laser beam through collective lens 22 is incident to the first beam splitter 41 and the second beam splitter 42, the incident angle of the laser beam to the first beam splitter 41 and the second beam splitter 42 changes continuously in the direction of the Y axis described above. Assuming that only one of the first beam splitter 41 is used as a light reduction mechanism, and the minimum incident angle to the first beam splitter 41 is 40° and the maximum is 50°, the transmittivity ratio of transmitted light at the minimum incident angle and the maximum incident angle is 0.92/0.75=1.2 times. In this case, the energy intensity distribution of the laser beam at the spot cannot be measured correctly.

An enlarged view of the first beam splitter 41 and the second beam splitter 42 is shown in FIG. 3. Note that in FIG. 3, the irradiation trajectory 15 of the laser beam indicates the trajectory of the laser beam incident to the first beam splitter 41 and the second beam splitter 42 and the trajectory of the transmitted light transmitting through the first beam splitter 41 and the second beam splitter 42, and the trajectory of the reflected light reflected from the first beam splitter 41 and the second beam splitter 42 is omitted from the diagram. Here, the first beam splitter 41 is arranged with the X axis as a rotation axis and inclined at an angle $\alpha$ in the range described above with respect to the plane 61 perpendicular to the optical axis 10, and the second beam splitter 42 is arranged with the X' axis as a rotation axis and inclined at an angle $-\alpha$ with respect to the plane 61 perpendicular to the optical axis 10. The value of incident angle of the laser beam with respect to the optical plane of the beam splitter at the position of the optical axis 10 of the first beam splitter 41 is $(90-\alpha)$ when expressed as an angle smaller than 90°, as shown in FIG. 3. Similarly, the value of incident angle of the laser beam with respect to the optical plane of the beam splitter at the position of the optical axis 10 of the second beam splitter 42 is $(90-\alpha)$ when expressed as an angle smaller than 90°. For example, the incident angle of the laser beam with respect to the optical plane of the beam splitter at the position of the upper end of the irradiation trajectory 15 of the first beam splitter 41 is expressed as $(90-\alpha)-\theta$ with respect to the incident angle value at the position of optical axis 10. The angle $\theta$ is the incident angle of the laser beam at the position of the upper end of the irradiation trajectory 15 relative to the imaginary line 62 parallel to the optical axis 10, that is, the difference angle from the incident angle at the position of the optical axis 10.

In this case, the transmitted light of the laser beam at the position of the upper end of the irradiation trajectory 15, which is incident to and transmitted through the first beam splitter 41 at an angle of $(90-\alpha)-\theta$, is incident to the second beam splitter 42 at an angle of $(90-\alpha)+\theta$. In other words, the laser beam at the position of the upper end of the irradiation trajectory 15 of the first beam splitter 41 is incident to the first beam splitter 41 at an incident angle shifted by an angle $-\theta$ with respect to an incident angle at the position of the optical axis 10, and the transmitted light of the laser beam at the position of the upper end of the irradiation trajectory 15 of the first beam splitter 41 is incident to the second beam splitter 42 at an incident angle shifted by an angle $\theta$ with respect to an incident angle at the position of the optical axis 10. As described above, when the incident angle of the laser beam to the beam splitter changes continuously from 45° to different values, the transmittivity value of the beam splitter changes continuously to different values. Therefore, the total transmittivity of the transmitted light of the laser beam at the position of the upper end of the irradiation trajectory 15 transmitted through the first beam splitter 41 and the second beam splitter 42 is almost the same as the total transmittivity of the transmitted light of the laser beam at the position of the optical axis 10. The above description is based on an example of transmitted light of the laser beam at the position of the upper end of the irradiation trajectory 15 of the first beam splitter 41, but it is valid for a laser beam at any position of the irradiation trajectory 15.

Note that since the first beam splitter 41 is inclined at the angle $\alpha$ with the X axis as a rotation axis and the second beam splitter 42 is inclined at the angle $-\alpha$ with the X' axis as a rotation axis, respectively, with such an arrangement, the incident angle of the laser beam on the optical planes of the first beam splitter 41 and the second beam splitter 42 does not change in the direction of the X axis.

In the configuration of the light reduction mechanism 40 shown in FIG. 1, when the energy intensity of the laser beam is not sufficiently reduced to be incident to the observation device 50, an optical element such as an ND filter that can reduce the light of the laser beam is placed between a beam splitter group of the first beam splitter 41 and the second beam splitter 42 and the observation device 50.

As described above, the first embodiment of the light reduction mechanism according to the present invention has the first beam splitter 41 and the second beam splitter 42 near the spot side than the laser beam irradiation optical unit 31, and in a case where the X axis and the Y axis are arbitrary orthogonal coordinate axes in the plane perpendicular to the optical axis 10 whose origin is in the optical axis 10, the first beam splitter 41 is arranged with the X axis as a rotation axis and inclined at an angle $\alpha$ in the range from 30° to 60° inclusive with respect to the plane perpendicular to the optical axis 10, and the second beam splitter 42 is arranged with the X' axis, which is parallel to the X axis and passes through the optical axis 10, as a rotation axis, and inclined at an angle $-\alpha$ with respect to the plane perpendicular to the optical axis 10, so that the energy intensity of the laser beam incident to the first beam splitter 41 and the second beam splitter 42 can be reduced and output from the light reduction mechanism. When the incident light to the first beam splitter 41 and the second beam splitter 42 is collected light having different incident angles depending on the incident position, the light reduction mechanism can reduce the energy intensity of the laser beam and output the reduced laser beam from the light reduction mechanism without biasing the energy intensity distribution of the emitted light as compared to the incident light. Furthermore, the power of the laser beam that can be incident to the light reduction mechanism is usually as high as 1 kW. Therefore, the light reduction mechanism can reduce the laser beam to an extent not to damage the observation device 50 that acquires image data, such as an image sensor or camera, and can measure the image shape and the energy intensity distribution of the laser beam at the spot when the energy intensity of the laser beam is high.

Second Embodiment of Light Reduction Mechanism

Figure 4:
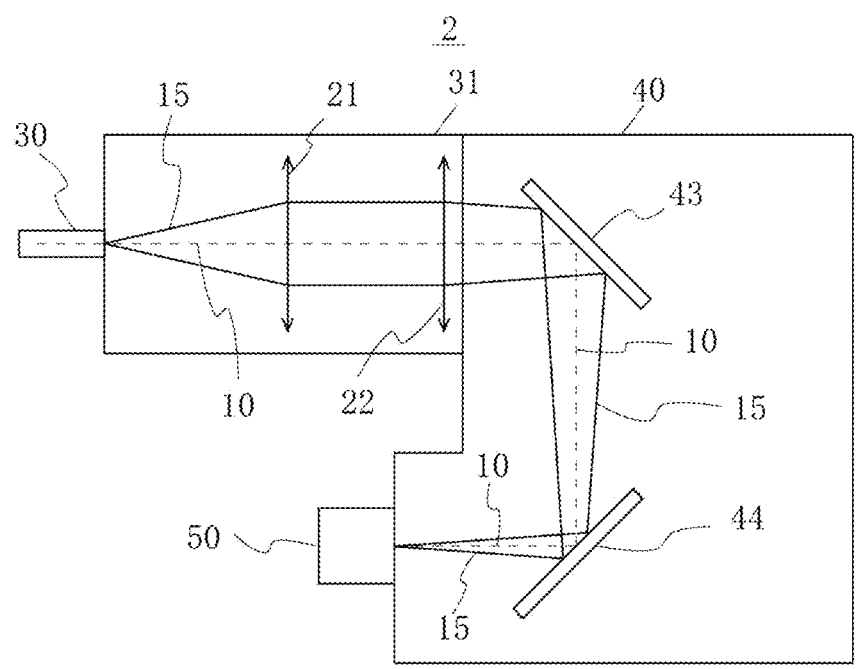
FIG. 4 is a schematic diagram of the light reduction mechanism of a second embodiment.

The second embodiment of the light reduction mechanism according to the present invention is a configuration of the light reduction mechanism 40 of the second embodiment 2 of the light reduction mechanism shown in FIG. 4, and includes a plate-type first beam splitter 43 and a second beam splitter 44 near the spot side (observation device 50 side) than the laser beam irradiation optical unit 31. The first beam splitter 43 and the second beam splitter 44 may be arranged in such a manner that the center positions of the first beam splitter 43 and the second beam splitter 44 are aligned with the optical axis 10, or at least in such a manner that the irradiation trajectory 15 of the laser beam is within the optical effective plane of the first beam splitter 43 and the second beam splitter 44. In a case where the X axis and the Y axis are arbitrary orthogonal coordinate axes in the plane perpendicular to the optical axis 10 whose origin is in the optical axis 10, the first beam splitter 43 is arranged with the X axis as a rotation axis and inclined at an angle α in the range from 30° to 60° inclusive with respect to the plane perpendicular to the optical axis 10, and the second beam splitter 44 is arranged with the X' axis, which is parallel to the X axis and passes through the optical axis 10, as a rotation axis, and inclined at an angle −α with respect to the plane perpendicular to the optical axis 10. Note that the plane perpendicular to the optical axis 10 in FIG. 4 is the plane perpendicular to the optical axis 10 that includes only one point on the optical axis 10, the X axis is a straight line on the plane perpendicular to the optical axis 10 described above that vertically penetrates the plane when the diagram in FIG. 4 is viewed as a plane with the optical axis 10 as the origin, and the Y axis is a straight line on the plane perpendicular to the optical axis 10 described above that is orthogonal to the X axis in the plane when the diagram in FIG. 4 is viewed as a plane with the optical axis 10 as the origin.

The first beam splitter 43 and the second beam splitter 44 have a function of separating an incident laser beam into transmitted light and reflected light. Note that in FIG. 4, the irradiation trajectory 15 of the laser beam indicates the trajectory of the laser beam incident to the first beam splitter 43 and the second beam splitter 44 and the trajectory of the reflected light reflected from the first beam splitter 43 and the second beam splitter 44, and the trajectory of the transmitted light transmitting through the first beam splitter 43 and the second beam splitter 44 is omitted from the diagram. In this case, it is preferable that the first beam splitter 43 and the second beam splitter 44 have a laser beam reflectivity of 1% or more and 5.0% or less at an incident angle of 45° of the laser beam to the beam splitter with respect to the optical planes of the beam splitters. This is because the energy intensity of the reflected light component of the laser beam decreases as compared to the incident laser beam. It is preferable that the first beam splitter 43 and the second beam splitter 44 have the same change characteristic of the "reflectivity at an incident angle other than 45°" of the laser beam to the beam splitter with respect to the optical planes of the beam splitters of the first beam splitter 43 and the second beam splitter 44 as compared with the case of the "reflectivity at 45°". Note that unnecessary transmitted light transmitted from the first beam splitter 43 and the second beam splitter 44 can be absorbed and released by irradiating the unnecessary transmitted light onto a copper plate with a black surface that can easily absorb the laser beam.

Note that the thicknesses of the first beam splitter 43 and the second beam splitter 44 are not particularly limited as long as they can be used for the light reduction mechanism, and the thicknesses of the first beam splitter 43 and the second beam splitter 44 can be the same or different.

The beam splitter is usually designed to have a specified transmittivity or reflectivity at an incident angle of 45° to the beam splitter with respect to the optical plane of the beam splitter. When the incident angle of the laser beam to the beam splitter changes continuously from 45° to different values, the reflectivity value of the beam splitter changes continuously to different values. In FIG. 4, as shown in irradiation trajectory 15, since the laser beam through collective lens 22 is incident to the first beam splitter 43 and the second beam splitter 44, the incident angle of the laser beam to the first beam splitter 43 and the second beam splitter 44 changes continuously in the direction of the Y axis described above. Therefore, the energy intensity distribution of the reflected light of the laser beam reflected by the first beam splitter 43 changes in the direction of the Y axis according to the change in reflectivity with respect to the energy intensity distribution of the incident light. Therefore, as similar to the description using FIG. 2 in the first embodiment of the light reduction mechanism, assuming that only one of the first beam splitter 43 is used as a light reduction mechanism, the reflectivity ratio of the reflected light at the minimum incident angle and the maximum incident angle to the first beam splitter 43 becomes large, and the energy intensity distribution of the laser beam at the spot cannot be measured correctly.

Figure 5:
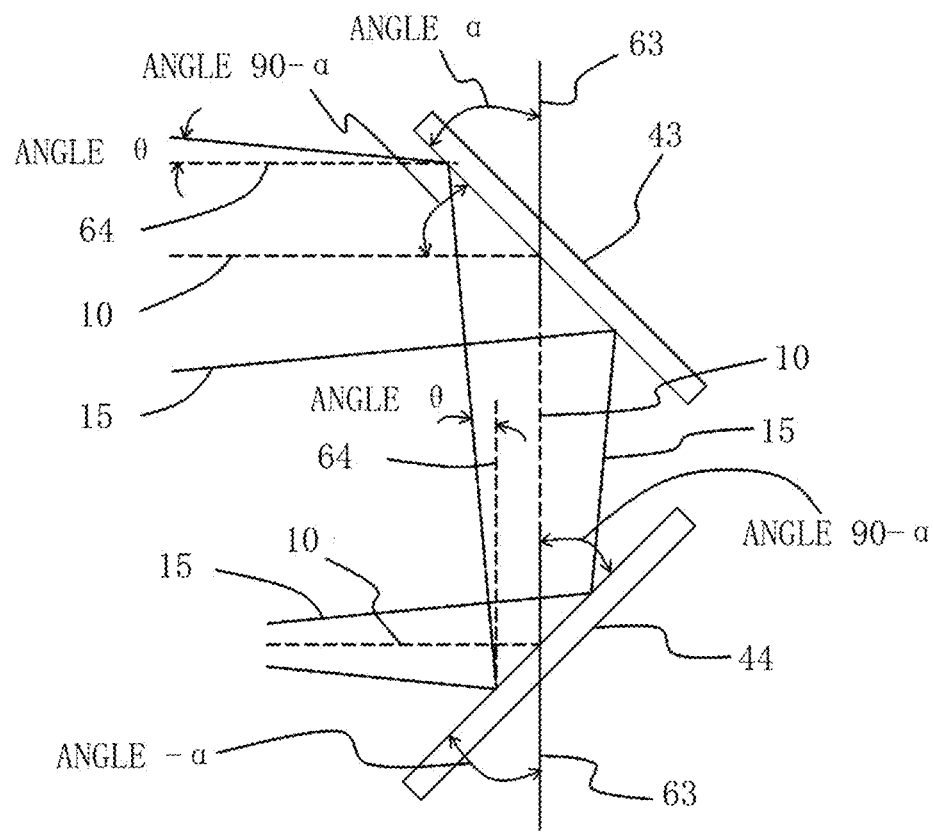
FIG. 5 is an enlarged view of a first beam splitter and a second beam splitter.

Enlarged views of the first beam splitter 43 and the second beam splitter 44 are shown in FIG. 5. Note that in FIG. 5, the irradiation trajectory 15 of the laser beam indicates the trajectory of the laser beam incident to the first beam splitter 43 and the second beam splitter 44 and the trajectory of the reflected light reflected from the first beam splitter 43 and the second beam splitter 44, and the trajectory of the transmitted light transmitting through the first beam splitter 43 and the second beam splitter 44 is omitted from the diagram. Here, the first beam splitter 43 is arranged with the X axis as a rotation axis and inclined at an angle α in the range described above with respect to the plane 63 perpendicular to the optical axis 10, and the second beam splitter 44 is arranged with the X' axis as a rotation axis and inclined at an angle −α with respect to the plane 63 perpendicular to the optical axis 10. The value of incident angle of the laser beam with respect to the optical plane of the beam splitter at the position of the optical axis 10 of the first beam splitter 43 is (90−α) when expressed as an angle smaller than 90°, as shown in FIG. 5. Similarly, the value of incident angle of the laser beam with respect to the optical plane of the beam splitter at the position of the optical axis 10 of the second beam splitter 44 is (90−α) when expressed as an angle smaller than 90°. For example, the incident angle of the laser beam with respect to the optical plane of the beam splitter at the position of the upper end of the irradiation trajectory 15 of the first beam splitter 43 is expressed as (90−α)−θ with respect to the incident angle value at the position of optical axis 10. The angle θ is the incident angle of the laser beam at the position of the upper end of the irradiation trajectory 15 relative to the imaginary line 64 parallel to the optical axis 10, that is, the difference angle from the incident angle at the position of the optical axis 10.

In this case, the reflected light of the laser beam at the position of the upper end of the irradiation trajectory 15, which is incident to and reflected by the first beam splitter 43 at an angle of (90−α)−θ, is incident to the second beam splitter 44 at an angle of (90−α)+θ. In other words, the laser beam at the position of the upper end of the irradiation trajectory 15 of the first beam splitter 43 is incident to the first beam splitter 43 at an incident angle shifted by an angle −θ with respect to an incident angle at the position of the optical axis 10, and the reflected light of the laser beam at the position of the upper end of the irradiation trajectory 15 of the first beam splitter 43 is incident to the second beam splitter 44 at an incident angle shifted by an angle θ with respect to an incident angle at the position of the optical axis 10. As described above, when the incident angle of the laser beam to the beam splitter changes continuously from 45° to different values, the reflectivity value of the beam splitter changes continuously to different values. Therefore, the total reflectivity of the reflected light of the laser beam at the position of the upper end of the irradiation trajectory 15 reflected by the first beam splitter 43 and the second beam splitter 44 is almost the same as the total reflectivity of the reflected light of the laser beam at the position of the optical axis 10. The above description is based on an example of reflected light of the laser beam at the position of the upper end of the irradiation trajectory 15 of the first beam splitter 43, but it is valid for a laser beam at any position of the irradiation trajectory 15.

Note that since the first beam splitter 43 is inclined at the angle α with the X axis as a rotation axis and the second beam splitter 44 is inclined at the angle −α with the X' axis as a rotation axis, respectively, with such an arrangement, the incident angle of the laser beam on the optical planes of the first beam splitter 43 and the second beam splitter 44 does not change in the direction of the X axis.

In the configuration of the light reduction mechanism 40 shown in FIG. 4, when the energy intensity of the laser beam is not sufficiently reduced to be incident to the observation device 50, an optical element such as an ND filter that can reduce the light of the laser beam is placed between a beam splitter group of the first beam splitter 43 and the second beam splitter 44 and the observation device 50.

As described above, the second embodiment of the light reduction mechanism according to the present invention has the first beam splitter 43 and the second beam splitter 44 near the spot side than the laser beam irradiation optical unit 31, and in a case where the X axis and the Y axis are arbitrary orthogonal coordinate axes in the plane perpendicular to the optical axis 10 whose origin is in the optical axis 10, the first beam splitter 43 is arranged with the X axis as a rotation axis and inclined at an angle α in the range from 30° to 60° inclusive with respect to the plane perpendicular to the optical axis 10, and the second beam splitter 44 is arranged with the X' axis, which is parallel to the X axis and passes through the optical axis 10, as a rotation axis, and inclined at an angle −α with respect to the plane perpendicular to the optical axis 10, so that the energy intensity of the laser beam incident to the first beam splitter 43 and the second beam splitter 44 can be reduced and output from the light reduction mechanism. When the incident light to the first beam splitter 43 and the second beam splitter 44 is collected light having different incident angles depending on the incident position, the light reduction mechanism can reduce the energy intensity of the laser beam and output the reduced laser beam from the light reduction mechanism without biasing the energy intensity distribution of the emitted light as compared to the incident light. Furthermore, the power of the laser beam that can be incident to the light reduction mechanism is usually as high as 1 kW. Therefore, the light reduction mechanism can reduce the laser beam to an extent not to damage the observation device 50 that acquires image data, such as an image sensor or camera, and can measure the image shape and the energy intensity distribution of the laser beam at the spot when the energy intensity of the laser beam is high.

Third Embodiment of Light Reduction Mechanism

Figure 6:
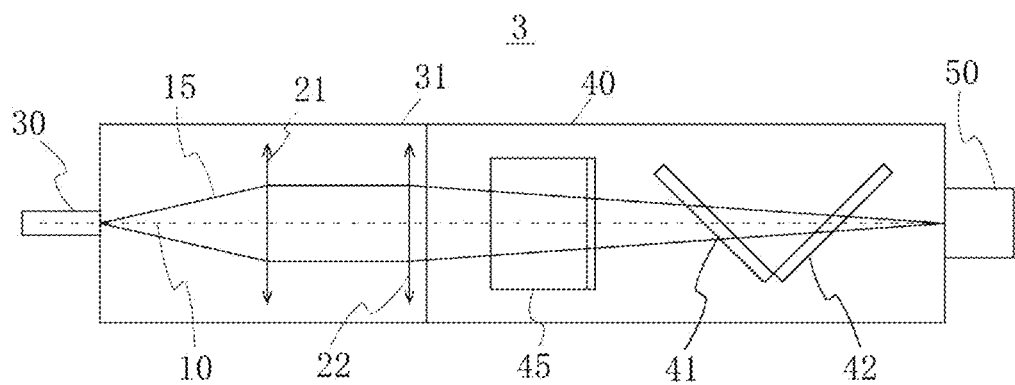
FIG. 6 is a schematic diagram of the light reduction mechanism of a third embodiment.

The third embodiment of the light reduction mechanism according to the present invention is a configuration of the light reduction mechanism 40 of the third embodiment 3 of the light reduction mechanism shown in FIG. 6, and includes a plate-type total thickness beam splitter 45, which is near the spot side than the laser beam irradiation optical unit 31 and near the source side of the laser beam than the first beam splitter 41 and the second beam splitter 42. The arrangement position of the total thickness beam splitter 45 can be on the spot side closer than the first beam splitter 41 and the second beam splitter 42, or between the first beam splitter 41 and the second beam splitter 42. That is, the light reduction mechanism 40 of the third embodiment 3 of the light reduction mechanism is a configuration in which the total thickness beam splitter 45 is added to the light reduction mechanism 40 of the first embodiment 1 of the light reduction mechanism. The total thickness beam splitter 45 may be arranged in such a manner that the center position of the total thickness beam splitter 45 is aligned with the optical axis 10, or at least in such a manner that the irradiation trajectory 15 of the laser beam is within the optical effective plane of the total thickness beam splitter 45. In a case where the X axis and the Y axis are arbitrary orthogonal coordinate axes in the plane perpendicular to the optical axis 10 whose origin is in the optical axis 10, the total thickness beam splitter 45 is arranged with the Y' axis, which is parallel to the Y axis and passes through the optical axis 10, as the rotation axis, and inclined at an angle β or angle −β in the range from 30° to 60° inclusive with respect to the plane perpendicular to the optical axis 10. Note that the plane perpendicular to the optical axis 10 in FIG. 6 is the plane perpendicular to the optical axis 10 that includes only one point on the optical axis 10, the X axis is a straight line on the plane perpendicular to the optical axis 10 described above that vertically penetrates the plane when the diagram in FIG. 6 is viewed as a plane with the optical axis 10 as the origin, and the Y axis is a straight line on the plane perpendicular to the optical axis 10 described above that is orthogonal to the X axis in the plane when the diagram in FIG. 6 is viewed as a plane with the optical axis 10 as the origin.

The total thickness beam splitter 45 is a plate-type beam splitter, and the thickness of the plate of the total thickness beam splitter 45 is preferably a value that satisfies the following formula 1.

$$d_{45}(n_{45}^2-1)\frac{\sin^2\beta}{\sqrt{(n_{45}^2-\sin^2\beta)^3}} = \qquad \text{(Formula 1)}$$

$$d_{41}(n_{41}^2-1)\frac{\sin^2\alpha}{\sqrt{(n_{41}^2-\sin^2\alpha)^3}} + d_{42}(n_{42}^2-1)\frac{\sin^2\alpha}{\sqrt{(n_{42}^2-\sin^2\alpha)^3}}$$

Here, the following is applicable,
$d_{45}$ is a thickness of the plate of the total thickness beam splitter 45,
$d_{41}$ is a thickness of the plate of the first beam splitter 41,
$d_{42}$ is a thickness of the plate of the second beam splitter 42,
$n_{45}$ is a refractive index of the optical material of the total thickness beam splitter 45, $n_{41}$ is a refractive index of the optical material of the first beam splitter 41, and $n_{42}$ is a refractive index of the optical material of the second beam splitter 42.

The total thickness beam splitter 45 has a function to separate the incident laser beam into transmitted light and reflected light. Note that in FIG. 6, the irradiation trajectory 15 of the laser beam indicates the trajectory of the laser beam incident to the first beam splitter 41 and the second beam splitter 42 and the total thickness beam splitter 45, the trajectory of the transmitted light transmitting through the first beam splitter 41 and the second beam splitter 42 and the total thickness beam splitter 45, and the trajectory of the reflected light reflected from the first beam splitter 41 and the second beam splitter 42 and the total thickness beam splitter 45 is omitted from the diagram. In this case, it is preferable that the total thickness beam splitter 45 has a laser beam transmittivity of 0.1, or more and 50.0% or less at an incident angle of 45° of the laser beam to the beam splitter with respect to the optical plane of the beam splitter. This is because the energy intensity of the transmitted light component of the laser beam decreases as compared to the incident laser beam. Note that unnecessary reflected light reflected from the total thickness beam splitter 45 can be absorbed and released by irradiating the unnecessary transmitted light onto a copper plate with a black surface that can easily absorb the laser beam.

Note that in a plate-type beam splitter, the transmitted light shifts with respect to the optical axis 10 due to refraction (the shift of the transmitted light is not shown in FIG. 6). However, since the light reduction mechanism is used to measure the energy intensity distribution of the laser beam and the image shape of the laser beam with the observation device 50, the shift of the transmitted light with respect to the optical axis 10 is not a problem.

Figure 7:
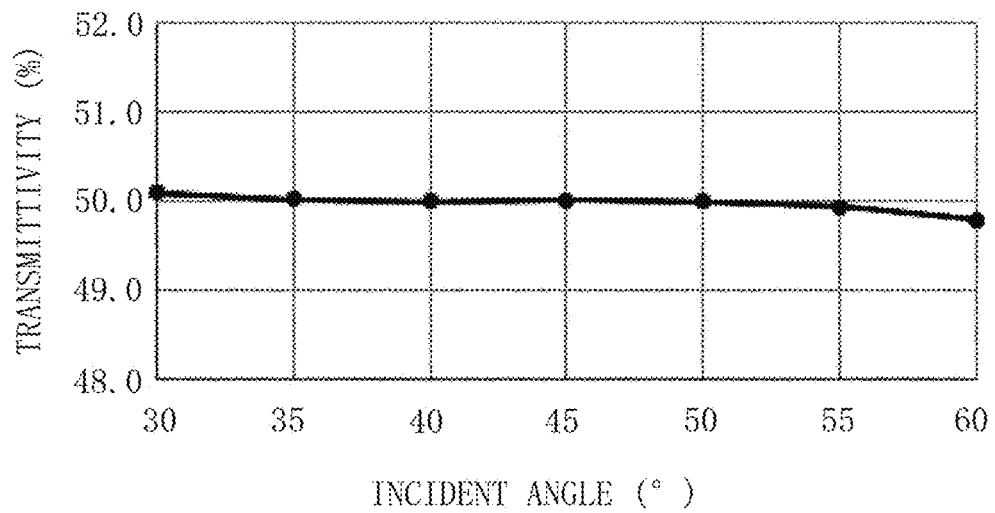
FIG. 7 shows the transmittivity characteristics of a total thickness beam splitter of the third embodiment with respect to the incident angle.

The beam splitter is usually designed to have a specified transmittivity or reflectivity at an incident angle of 45° to the beam splitter with respect to the optical plane of the beam splitter. When the incident angle of the laser beam to the beam splitter changes continuously from 45° to different values, the transmittivity value of the beam splitter changes continuously to different values. FIG. 7 shows an example design of transmittivity with respect to the incident angle to a beam splitter that uses a 10-layer optical thin film to reduce the incident angle dependence of transmittivity. The horizontal axis shows the incident angle (°) of the laser beam to the beam splitter, and the vertical axis shows the transmittivity (%) of the laser beam. Here, the transmittivity at an incident angle of 40° is almost 50.0%, and the transmittivity at an incident angle of 50° is also almost 50.0%. Assuming that the minimum incident angle to the total thickness beam splitter 45 is 40° and the maximum incident angle to the total thickness beam splitter 45 is 50°, the transmittivity ratio of transmitted light at the minimum incident angle and the maximum incident angle is 50.0/50.0=1.0 times. In other words, as compared with the case where the transmittivity at an incident angle of 45° of the laser beam is less than 1% as shown in FIG. 2, when the transmittivity is about 50%, there is no or extremely little change in transmittivity when the incident angle of the laser beam differs to some extent. In other words, the energy intensity distribution of the transmitted light of the laser beam transmitted through the total thickness beam splitter 45 is almost the same as the energy intensity distribution of the incident light to the total thickness beam splitter 45.

Note that when the incident angle dependence of transmittivity is reduced as shown in FIG. 7, the smaller the value of transmittivity of the laser beam at an incident angle of 45° of the laser beam to the beam splitter, the greater the number of layers of optical thin film required, making the design more difficult and increasing the manufacturing cost. Therefore, it is preferable that the total thickness beam splitter 45 has a laser beam transmittivity of 10.0% or more and 50.0% or less at an incident angle of 45° of the laser beam to the beam splitter with respect to the optical plane of the beam splitter.

As shown in FIG. 6, the first beam splitter 41 is arranged with the X axis as a rotation axis and inclined at an angle α in the range from 300 to 600 inclusive with respect to the plane perpendicular to the optical axis 10, and the second beam splitter 42 is arranged with the X' axis, which is parallel to the X axis and passes through the optical axis 10, as a rotation axis and inclined at an angle −α with respect to the plane perpendicular to the optical axis 10. When a plate-type beam splitter is arranged in such a manner that the plate-type beam splitter is inclined with respect to the plane perpendicular to the optical axis 10, in a case of parallel light incident to the beam splitter, the emitted light from the beam splitter has an orbit shift with respect to the incident light due to refraction. When converged light is incident to the beam splitter, in addition to the orbit shift, astigmatism occurs in which the X axis direction of the emitted light is converged at the same focal length, while the Y axis direction of the emitted light is converged at a different focal length. In other words, the image of the laser beam transmitted through only the first beam splitter 41 and the second beam splitter 42, with X axis as a rotation axis, is distorted in the Y axis direction due to astigmatism.

Figure 8:
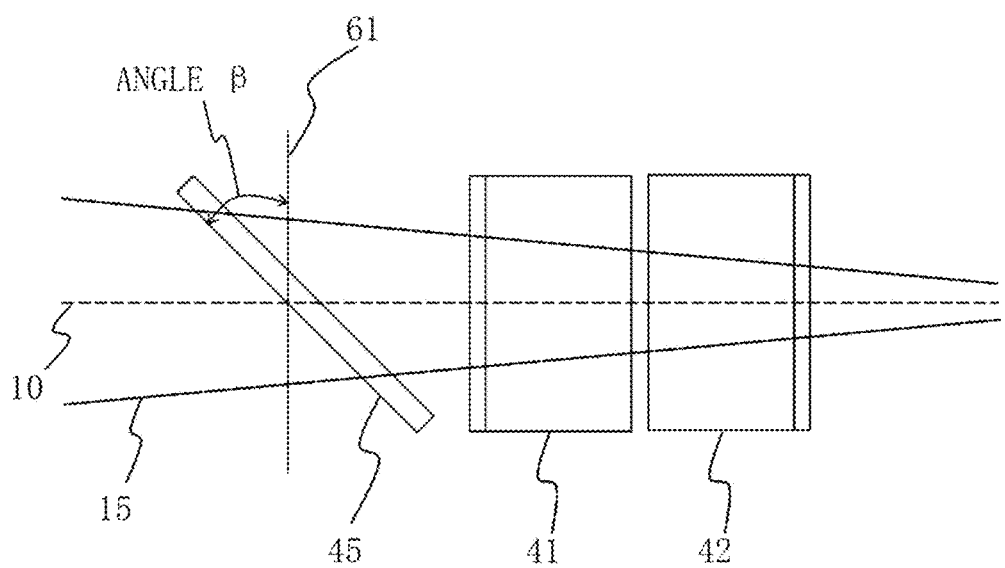
FIG. 8 is an enlarged view of the total thickness beam splitter, the first beam splitter, and the second beam splitter.

Therefore, in the light reduction mechanism 40 of the third embodiment 3 of the light reduction mechanism, the above described total thickness beam splitter 45 is arranged. As shown in FIG. 8, the total thickness beam splitter 45 is arranged with the Y' axis, which is parallel to the Y axis and passes through the optical axis 10, as a rotation axis, and inclined at an angle β or angle −β in the range from 30° to 60° inclusive with respect to the plane perpendicular to the optical axis 10. Note that FIG. 8 is an enlarged view of the part of the total thickness beam splitter 45, the first beam splitter 41, and the second beam splitter 42 at the viewpoint in which the third embodiment 3 of the light reduction mechanism in FIG. 6 is rotated by 90° with the optical axis 10 as a rotation axis. In FIG. 8, the irradiation trajectory 15 of the laser beam indicates the trajectory of the laser beam incident to the total thickness beam splitter 45, the first beam splitter 41, and the second beam splitter 42, the trajectory of the transmitted light transmitting through the total thickness beam splitter 45, the first beam splitter 41, and the second beam splitter 42, and the trajectory of the reflected light reflected from the total thickness beam splitter 45, the first beam splitter 41, and the second beam splitter 42 is omitted from the diagram. In FIG. 8, the Y axis is a straight line on the plane 61 perpendicular to the optical axis 10 that vertically penetrates the plane when the diagram in FIG. 8 is viewed as a plane with the optical axis 10 as the origin, and the X axis is a straight line on the plane 61 perpendicular to the optical axis 10 that is orthogonal to the Y axis in the plane when the diagram in FIG. 8 is viewed as a plane with the optical axis 10 as the origin.

As a result, the image shape of the transmitted light component of the total thickness beam splitter 45 is distorted in the X axis direction due to astigmatism for the same reason as described above for the first beam splitter 41 and the second beam splitter 42. Here, the thickness of each plate of the total thickness beam splitter 45, the first beam splitter 41, and the second beam splitter 42 is selected to be a value that satisfies the aforementioned formula 1. And Formula 1 indicates that the astigmatic difference which is the difference in focal length caused by astigmatism of the total thickness beam splitter 45, is equal to the total astigmatic difference caused by astigmatism of each of the first beam splitter 41 and the second beam splitter 42. In other words, the amount of distortion of the image shape in the X axis direction of the total thickness beam splitter 45 is the same as the total amount of distortion of the image shape in the Y axis direction of the first beam splitter 41 and the second beam splitter 42. Therefore, the image shape of the laser beam at the spot observed by the observation device 50 in the third embodiment 3 of the light reduction mechanism is a similar image shape to the image shape of the laser beam incident to the light reduction mechanism 40 in the third embodiment 3 of the light reduction mechanism.

In the configuration of the light reduction mechanism 40 shown in FIG. 6, when the energy intensity of the laser beam is not sufficiently reduced to be incident to the observation device 50, an optical element such as an ND filter that can reduce the light of the laser beam is placed between a beam splitter group of the first beam splitter 41 and the second beam splitter 42 and the total thickness beam splitter 45 and the observation device 50.

As described above, the third embodiment of the light reduction mechanism according to the present invention has a total thickness beam splitter 45 near the spot side than the laser beam irradiation optical unit 31 and having a thickness of the plate satisfying formula 1, and is a configuration in which the total thickness beam splitter 45 is added to the light reduction mechanism 40 of the first embodiment 1 of the light reduction mechanism, which is the first embodiment of the light reduction mechanism. In a case where the X axis and the Y axis are arbitrary orthogonal coordinate axes in the plane perpendicular to the optical axis 10 whose origin is in the optical axis 10, the total thickness beam splitter 45 is arranged with the Y' axis, which is parallel to the Y axis and passes through the optical axis 10, as the rotation axis, and inclined at an angle β or angle −β in the range from 30° to 60° inclusive with respect to the plane perpendicular to the optical axis 10, so that the energy intensity of the laser beam incident to the light reduction mechanism 40 in the third embodiment 3 of the light reduction mechanism can be reduced and output from the light reduction mechanism 40. When the incident light to the light reduction mechanism 40 is collected light having different incident angles depending on the incident position, the light reduction mechanism 40 can reduce the energy intensity of the laser beam and output the reduced laser beam from the light reduction mechanism 40 without biasing the energy intensity distribution of the emitted light as compared to the incident light. The image shape of the laser beam at the spot observed by the observation device 50 in the third embodiment 3 of the light reduction mechanism is a similar image shape to the image shape of the laser beam incident to the light reduction mechanism 40. Furthermore, the power of the laser beam that can be incident to the light reduction mechanism is usually as high as 2 kW. Therefore, the light reduction mechanism can reduce the laser beam to an extent not to damage the observation device 50 that acquires image data, such as an image sensor or camera, and can measure the image shape and the energy intensity distribution of the laser beam at the spot when the energy intensity of the laser beam is high.

Fourth Embodiment of Light Reduction Mechanism

Figure 9:
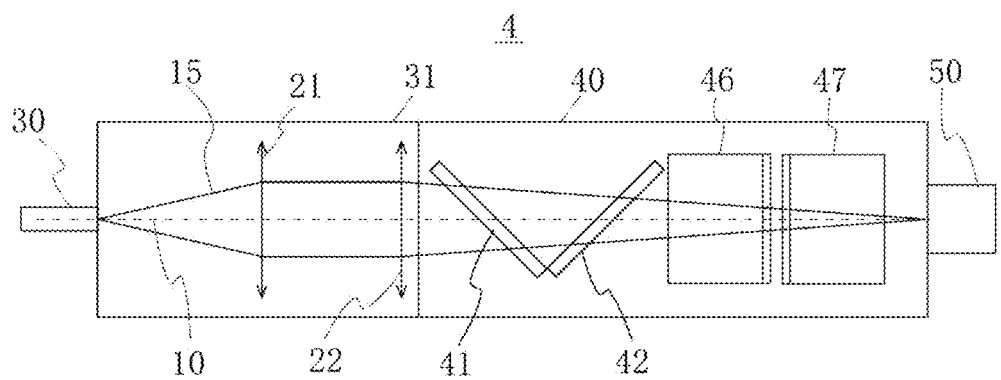
FIG. 9 is a schematic diagram of the light reduction mechanism of a fourth embodiment.

The fourth embodiment of the light reduction mechanism according to the present invention is a configuration of the light reduction mechanism 40 of the fourth embodiment 4 of the light reduction mechanism shown in FIG. 9, and includes a third beam splitter 46 and a fourth beam splitter 47 near the spot side (observation device 50 side) that the first beam splitter 41 and the second beam splitter 42. The arrangement positions of the third beam splitter 46 and the fourth beam splitter 47 are arbitrary as long as they are arranged near the spot side than the laser beam irradiation optical unit 31, for example, the third beam splitter 46 is arranged between the first beam splitter 41 and the second beam splitter 42. In other words, the light reduction mechanism 40 of the fourth embodiment 4 of the light reduction mechanism is a configuration in which the third beam splitter 46 and the fourth beam splitter 47 are added to the light reduction mechanism 40 of the first embodiment 1 of the light reduction mechanism. The third beam splitter 46 and the fourth beam splitter 47 may be arranged in such a manner that the center positions of the third beam splitter 46 and the fourth beam splitter 47 are aligned with the optical axis 10, and at least in such a manner that the irradiation trajectory 15 of the laser beam is within the optical effective plane of the third beam splitter 46 and the fourth beam splitter 47. In a case where the X axis and the Y axis are arbitrary orthogonal coordinate axes in the plane perpendicular to the optical axis 10 whose origin is in the optical axis 10, the third beam splitter 46 is arranged with the Y" axis, which is parallel to the Y axis and passes through the optical axis 10, as a rotation axis and inclined at an angle β in the range from 30° to 60° inclusive with respect to the plane perpendicular to the optical axis 10, and the fourth beam splitter 47 is arranged with the Y''' axis, which is parallel to the Y axis and passes through the optical axis 10, as a rotation axis and inclined at an angle −β with respect to the plane perpendicular to the optical axis 10. Note that the plane perpendicular to the optical axis 10 in FIG. 9 is the plane perpendicular to the optical axis 10 that includes only one point on the optical axis 10, the X axis is a straight line on the plane perpendicular to the optical axis 10 described above that vertically penetrates the plane when the diagram in FIG. 9 is viewed as a plane with the optical axis 10 as the origin, and the Y axis is a straight line on the plane perpendicular to the optical axis 10 described above that is orthogonal to the X axis in the plane when the diagram in FIG. 9 is viewed as a plane with the optical axis 10 as the origin.

The third beam splitter 46 and the fourth beam splitter 47 are plate-type beam splitters, and the thicknesses of the plates of the third beam splitter 46 and the fourth beam splitter 47 are preferably numerical values that satisfy the following formula 2.

$$d_{46}(n_{46}^2 - 1)\frac{\sin^2\beta}{\sqrt{(n_{46}^2 - \sin^2\beta)^3}} + d_{47}(n_{47}^2 - 1)\frac{\sin^2\beta}{\sqrt{(n_{47}^2 - \sin^2\beta)^3}} = \quad \text{(Formula 2)}$$

$$d_{41}(n_{41}^2 - 1)\frac{\sin^2\alpha}{\sqrt{(n_{41}^2 - \sin^2\alpha)^3}} + d_{42}(n_{42}^2 - 1)\frac{\sin^2\alpha}{\sqrt{(n_{42}^2 - \sin^2\alpha)^3}}$$

Here, the following is applicable.

$d_{46}$ is a thickness of the plate of the third beam splitter 46,
$d_{47}$ is a thickness of the plate of the fourth beam splitter 47,
$d_{41}$ is a thickness of the plate of the first beam splitter 41,
$d_{42}$ is a thickness of the plate of the second beam splitter 42, $n_{46}$ is a refractive index of the optical material of the third beam splitter 46, $n_{47}$ is a refractive index of the optical material of the fourth beam splitter 47, $n_{41}$ is a refractive index of the optical material of the first beam splitter 41, and $n_{42}$ is a refractive index of the optical material of the second beam splitter 42.

The third beam splitter 46 and the fourth beam splitter 47 have a function of separating the incident laser beam into transmitted light and reflected light. Note that in FIG. 9, the irradiation trajectory 15 of the laser beam indicates the trajectory of the laser beam incident to the first beam splitter 41, the second beam splitter 42, the third beam splitter 46, and the fourth beam splitter 47, the trajectory of the transmitted light transmitting through the first beam splitter 41, the second beam splitter 42, the third beam splitter 46, and the fourth beam splitter 47, and the trajectory of the reflected light reflected from the first beam splitter 41, the second beam splitter 42, the third beam splitter 46, and the fourth beam splitter 47 is omitted from the diagram. In this case, it is preferable that the third beam splitter 46 and the fourth beam splitter 47 have a laser beam transmittivity of 0.1% or more and 5.0% or less at an incident angle of 45° of the laser beam to the beam splitter with respect to the optical planes of the beam splitters. This is because the energy intensity of the transmitted light component of the laser beam decreases as compared to the incident laser beam. It is preferable that the third beam splitter 46 and the fourth beam splitter 47 have the same change characteristic of the "transmittivity at an incident angle other than 45°" of the laser beam to the beam splitter with respect to the optical planes of the beam splitters of the third beam splitter 46 and the fourth beam splitter 47 as compared with the case of the "transmittivity at 45°". Note that unnecessary reflected light reflected from the third beam splitter 46 and the fourth beam splitter 47 can be absorbed and released by irradiating the unnecessary reflected light onto a copper plate with a black surface that can easily absorb the laser beam.

In a plate-type beam splitter, the transmitted light shifts with respect to the optical axis 10 due to refraction (the shift of the transmitted light is not shown in FIG. 9). However, since the light reduction mechanism is used to measure the energy intensity distribution of the laser beam and the image shape of the laser beam with the observation device 50, the shift of the transmitted light with respect to the optical axis 10 is not a problem.

As shown in FIG. 9, the first beam splitter 41 is arranged with the X axis as a rotation axis and inclined at an angle α in the range from 30° to 60° inclusive with respect to the plane perpendicular to the optical axis 10, and the second beam splitter 42 is arranged with the X' axis, which is parallel to the X axis and passes through the optical axis 10, as a rotation axis and inclined at an angle −α with respect to the plane perpendicular to the optical axis 10. When a plate-type beam splitter is arranged in such a manner that the plate-type beam splitter is inclined with respect to the plane perpendicular to the optical axis 10, in a case of parallel light incident to the beam splitter, the emitted light from the beam splitter has an orbit shift with respect to the incident light due to refraction. When converged light is incident to the beam splitter, in addition to the orbit shift, astigmatism occurs in which the X axis direction of the emitted light is converged at the same focal length, while the Y axis direction of the emitted light is converged at a different focal length. In other words, the image of the laser beam transmitted through only the first beam splitter 41 and the second beam splitter 42, with X axis as a rotation axis, is distorted in the Y axis direction due to astigmatism.

Therefore, in the light reduction mechanism 40 of the fourth embodiment 4 of the light reduction mechanism, the third beam splitter 46 and the fourth beam splitter 47 described above are arranged. As described above, the third beam splitter 46 is arranged with the Y" axis as a rotation axis and inclined at an angle β in the range from 30° to 60° inclusive with respect to the plane perpendicular to the optical axis 10, and the fourth beam splitter 47 is arranged with the Y''' axis, which is parallel to the Y axis and passes through the optical axis 10, as a rotation axis and inclined at an angle −β with respect to the plane perpendicular to the optical axis 10. As a result, the image shapes of the transmitted light component of the third beam splitter 46 and the fourth beam splitter 47 are distorted in the X axis direction due to astigmatism for the same reason as described above for the first beam splitter 41 and the second beam splitter 42. Here, the thickness of each plate of the third beam splitter 46, the fourth beam splitter 47, the first beam splitter 41, and the second beam splitter 42 is selected to satisfy the aforementioned formula 2. Formula 2 indicates that the total astigmatic difference which is the difference in focal length caused by astigmatism of each of the third beam splitter 46 and the fourth beam splitter 47, is equal to the total astigmatic difference caused by astigmatism of each of the first beam splitter 41 and the second beam splitter 42. In other words, the total amount of distortion in the X axis direction of the third beam splitter 46 and the fourth beam splitter 47 is the same as the total amount of distortion in the Y axis direction of the first beam splitter 41 and the second beam splitter 42. Therefore, the image shape of the laser beam at the spot observed by the observation device 50 in the fourth embodiment 4 of the light reduction mechanism is a similar image shape to the image shape of the laser beam incident to the light reduction mechanism 40 in the fourth embodiment 4 of the light reduction mechanism.

In the configuration of the light reduction mechanism 40 shown in FIG. 9, when the energy intensity of the laser beam is not sufficiently reduced to be incident to the observation device 50, an optical element such as an ND filter that can reduce the light of the laser beam is placed between a beam splitter group of the first beam splitter 41 and the second beam splitter 42 and the third beam splitter 46 and the fourth beam splitter 47 and the observation device 50.

As described above, the fourth embodiment of the light reduction mechanism according to the present invention has the third beam splitter 46 and the fourth beam splitter 47 near the spot side than the laser beam irradiation optical unit 31 and having a thickness of the plate satisfying formula 2, and is a configuration in which the third beam splitter 46 and the fourth beam splitter 47 are added to the light reduction mechanism 40 of the first embodiment 1 of the light reduction mechanism, which is the first embodiment of the light reduction mechanism. In a case where the X axis and the Y axis are arbitrary orthogonal coordinate axes in the plane perpendicular to the optical axis 10 whose origin is in the optical axis 10, the third beam splitter 46 is arranged with the Y" axis, which is parallel to the Y axis and passes through the optical axis 10, as a rotation axis and inclined at an angle β in the range from 30° to 60° inclusive with respect to the plane perpendicular to the optical axis 10, and the fourth beam splitter 47 is arranged with the Y''' axis, which is parallel to the Y axis and passes through the optical axis 10, as a rotation axis and inclined at an angle −β with respect to the plane perpendicular to the optical axis 10, so that the energy intensity of the laser beam incident to the light reduction mechanism 40 in the fourth embodiment 4 of the light reduction mechanism can be reduced and output from the light reduction mechanism 40. When the incident light to the light reduction mechanism 40 is collected light having different incident angles depending on the incident position, the light reduction mechanism 40 can reduce the energy intensity of the laser beam and output the reduced laser beam from the light reduction mechanism 40 without biasing the energy intensity distribution of the emitted light as compared to the incident light. The image shape of the laser beam at the spot observed by the observation device 50 in the fourth embodiment 4 of the light reduction mechanism is a similar image shape to the image shape of the laser beam incident to the light reduction mechanism 40. Furthermore, the power of the laser beam that can be incident to the light reduction mechanism is usually as high as 4 kW. Therefore, the light reduction mechanism can reduce the laser beam to an extent not to damage the observation device 50 that acquires image data, such as an image sensor or camera, and can measure the image shape and the energy intensity distribution of the laser beam at the spot when the energy intensity of the laser beam is high.

[Collimation Lens]

The collimation lens 21 is an optical element that makes the laser beam output radially from the output end of the optical fiber 30 into parallel light.

[Collective Lens]

The collective lens 22 is an optical element that collects the laser beam transformed into parallel light by the collimation lens 21 onto a spot.

[Beam Splitter]

There are two types of beam splitter, the cube-type and the plate-type, and the plate-type is preferred for the beam splitter according to the present invention. The shape of the plate-type beam splitter is not particularly limited as long as the beam splitter can be used for the light reduction mechanism according to the present invention, and the shape may be square, polygonal, or circular. The plate-type beam splitter may be polarized or unpolarized. The cube-type is not preferred because there are a plurality of planes perpendicular to the incident direction of the laser beam, which causes return light of the laser beam to the laser oscillator (light source) and makes the oscillation of the laser unstable. In addition, the cube-type is usually constructed by joining the slopes of two prisms together using a bonding resin. The cube-type also has a larger volume than the plate-type. Therefore, the cube-type is not preferred because, for example, the resin used for bonding is easily degenerated by the heat generated when the laser beam is incident, and the generated heat is harder to release as compared with the plate-type, making the cube-type easy to be damaged.

[Observation Device]

The observation device 50 is not particularly limited as long as the observation device 50 can observe the irradiation position and the image shape of the laser beam at the spot, and also the energy intensity distribution of the laser beam at the spot, and all observation devices such as CCD, CMOS, or other image sensors can be used. The observation device 50 is preferably capable of outputting the results of the observation as data. This is because the output data from the observation device 50 can be numerically calculated using a calculation device. The light reduction mechanism 40 to which the observation device 50 is connected is preferably detachable from the laser beam irradiation optical unit 31. When light reduction mechanism 40 is connected to laser beam irradiation optical unit 31, the position of the imaging face (observation point) of observation device 50 is preferably located at the same location as the surface of the workpiece to be processed where the spot is formed during laser processing. Furthermore, the location of the center of the imaging face of the observation device 50 is preferably located at the optical axis 10 and at the center of the processed portion of the workpiece to be processed. This is because the position of the laser beam and the energy distribution of the laser beam can be observed at the same location as the surface of the workpiece to be processed where the spot is formed.

[Calculation Device]

The calculation device according to the present invention can be any calculation device that is programmable and capable of performing numerical calculations on the output data from the observation device 50 described above, and is preferably to have a storage device to store the data. This is because the image shape data (primary data) of the laser beam at a plurality of spot positions (focal length positions) can be acquired in advance and stored in the storage device by performing optical calculations based on the optical information of the optical system on the light source side closer than the light reduction mechanism 40 arranged in the first embodiment 1 of the light reduction mechanism. This is because after irradiating the laser beam and acquiring the image shape data (secondary data) of the laser beam from the observation device 50 at an arbitrary position set as a spot position in the optical system including the light reduction mechanism 40, that is, in the first embodiment 1 of the light reduction mechanism, from the primary data, the image shape data at the same spot position (focal length position) where the secondary data is acquired is selected, and the coordinate position is corrected for the secondary data in the Y axis direction in the calculation device.

2. Embodiment of the Output Data Correction Method that Performs a Numerical Calculation of Output Data from the Observation Device for Correction In the first embodiment 1 of the light reduction mechanism, which is the first embodiment of the light reduction mechanism, the first beam splitter 41 is arranged with the X axis as a rotation axis and inclined at an angle α in the range from 30° to 60° inclusive with respect to the plane perpendicular to the optical axis 10, and the second beam splitter 42 is arranged with the X' axis, which is parallel to the X axis and passes through the optical axis 10, as a rotation axis and inclined at an angle −α with respect to the plane perpendicular to the optical axis 10. When a plate-type beam splitter is arranged in such a manner that the plate-type beam splitter is inclined with respect to the plane perpendicular to the optical axis 10, in a case of parallel light incident to the beam splitter, the emitted light from the beam splitter has an orbit shift with respect to the incident light due to refraction. When converged light is incident to the beam splitter, in addition to the orbit shift, astigmatism occurs in which the X axis direction of the emitted light is converged at the same focal length, while the Y axis direction of the emitted light is converged at a different focal length. In other words, the image of the laser beam transmitted through the first beam splitter 41 and the second beam splitter 42, with X axis as a rotation axis, is distorted in the Y axis direction due to astigmatism. As a result, the image shape of the laser beam at the spot is observed to be distorted in the Y axis direction in the first embodiment 1 of the light reduction mechanism. The correction method according to the present invention is an output data correction method, in which in the first embodiment 1 of the light reduction mechanism, the image shape of the laser beam at the spot observed to be distorted in the Y axis direction due to astigmatism is corrected to an appropriate image shape by performing numerical calculations to correct the coordinate positions of the output data in the Y axis direction using the output data from the observation device 50. The following describes an embodiment of the output data correction method that performs the numerical calculation to correct the coordinate positions of the output data in the Y axis direction to correct the image shape to the appropriate image shape, and the method is not limited to the following descriptions as long as the coordinate positions of the output data in the Y axis direction can be corrected.

First Embodiment of Correction Method

The first embodiment of the correction method is an output data correction method that can be used when the outer contour of the image shape, at the plane perpendicular to the optical axis 10, of the laser beam incident to the light reduction mechanism 40 is a circle. In this case, since the outer contour of the image shape, at the plane perpendicular to the optical axis 10, of the laser beam incident to the light reduction mechanism 40 is a circle, the ratio of the size in the X axis direction to the size in the Y axis direction in the outer contour of the image shape of the laser beam incident to the light reduction mechanism 40 is 1:1. At this time, since the image on the X axis of the image shape of the laser beam at the spot output from the light reduction mechanism 40 is not distorted, the Y axis position of the output data can be corrected using the ratio of the diameter of the image on the Y axis with the diameter of the image on the X axis as a reference.

For example, in the imaging face of the observation device 50, the diameter value of the image in the X axis direction is a, the diameter value of the image in the Y axis direction is b, and the coordinate value in the X axis and the coordinate value in the Y axis in an arbitrary position of the output data from the observation device 50 are x and y, respectively. In this case, the corrected data position of the arbitrary position can be expressed by x for the coordinate value in the X axis and $(a/b) \cdot y$ for the coordinate value in the Y axis. In other words, by performing the numerical calculation using the calculation device to correct the coordinate positions in the Y axis direction for the output data from the observation device 50 as described above, the corrected output data can be obtained as an appropriate image shape. It is possible to observe the image shape at the spot by displaying the corrected output data on a display device.

Second Embodiment of Correction Method

The second embodiment of the correction method is an output data correction method that can be used when the outer contour of the image shape, at the plane perpendicular to the optical axis 10, of the laser beam incident to the light reduction mechanism 40 is a circle or other than a circle. First, the optical calculation is performed based on the optical information of the optical system on the light source side closer than the light reduction mechanism 40, that is, in the first embodiment 1 of the light reduction mechanism, the image shape of the laser beam from the light source, and the optical information of the collimation lens 21 and the collective lens 22 to obtain the image shape data (primary data) of the laser beam at a plurality of spot positions (focal length positions) in advance when the light reduction mechanism 40 is not included, and the data is stored in the storage device of the calculation device. Next, in the optical system including the light reduction mechanism 40, that is, in the first embodiment 1 of the light reduction mechanism, the laser beam is irradiated and the image shape data (secondary data) of the laser beam is obtained from the observation device 50 at an arbitrary position set as the spot position.

Then, from the primary data, the image shape data at the same spot position (focal length position) where the secondary data is acquired is selected, and the maximum image size value of the image shape in the X axis direction is a, and the maximum image size value in the Y axis direction is b. From the secondary data, the maximum image size value of the image shape in the X axis direction is c, and the maximum image size value in the Y axis direction is d. In this case, when the coordinate value in the X axis and the coordinate value in the Y axis in an arbitrary position of the output data from the observation device 50 are x and y, respectively, the corrected data position of the arbitrary position can be expressed by x for the coordinate value in the X axis and $((b \cdot c)/(a \cdot d)) \cdot y$ for the coordinate value in the Y axis. In other words, by performing the numerical calculation using the calculation device to correct the coordinate positions in the Y axis direction for the output data from the observation device 50 as described above, the corrected output data can be obtained as an appropriate image shape. It is possible to observe the corrected output data as the image shape at the spot by displaying the corrected output data on a display device.

3. Embodiment of Laser Beam Measurement Device

The laser beam measurement device according to the present invention is a device for confirming the image shape of the laser beam at the spot and the energy intensity distribution in the image shape, and includes one of the light reduction mechanisms 40 from the first embodiment of the light reduction mechanism to the fourth embodiment of the light reduction mechanism described above. The laser beam measurement device preferably includes the observation device 50 and the calculation device described above. As a result, when the energy intensity of the laser beam incident to the light reduction mechanism 40 is high, the laser beam can be reduced to an extent not to damage the observation device 50 that acquires image data, such as an image sensor or a camera, and the image shape and the energy intensity distribution of the laser beam at the spot can be measured. This is because it is possible to visually confirm the image shape and the energy intensity distribution of the laser beam at the spot, and to correct the image shape observed to be distorted in the Y axis direction due to astigmatism using output data.

The embodiments according to the present invention described above is one aspect of the present invention, and may be modified as necessary within the scope that does not deviate from the purpose of the present invention. Although the present invention is described more specifically with examples below, the present invention is not limited to the following examples.

First Example

In a first example, the configuration of the light reduction mechanism 40 of the first embodiment 1 of the light reduction mechanism shown in FIG. 1, which is the first embodiment of the light reduction mechanism, is used. A laser beam having a wavelength of 1068 nm is used. The collective lens 22 having an annular shape conversion function is used so that the image shape at the spot is annular. The beam splitters used are the plate-type first beam splitter 41 and the plate-type second beam splitter 42, each of which has a thickness of 3 mm and has the transmittivity characteristics shown in FIG. 2. The first beam splitter 41 is arranged with the X axis as a rotation axis and inclined at an angle of 45°, and the second beam splitter 42 is arranged with the X' axis as a rotation axis and inclined at an angle of −45°.

Figure 10A:
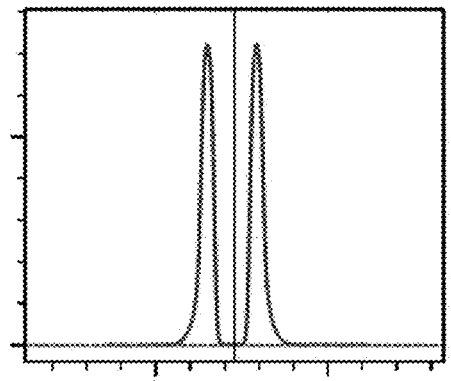
FIG. 10 shows results of measuring the energy intensity distribution in the image at the spot in Example 1.
Figure 10B:
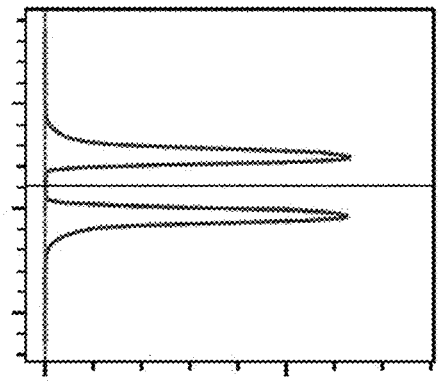

FIG. 10 shows the results of measuring the energy intensity distribution in the image at the spot in the present configuration. FIG. 10A shows the energy intensity distribution on the X axis of the image at the spot, in which the horizontal axis indicates the coordinate position of the X axis and the vertical axis indicates the energy intensity. FIG. 10B shows the energy intensity distribution on the Y axis of the image at the spot, in which the vertical axis indicates the coordinate position of the Y axis and the horizontal axis indicates the energy intensity. From FIG. 10, it is clear that the energy intensity distribution in the image shape obtained from the light reduction mechanism in Example 1 is in an unbiased state.

Figure 11:
FIG. 11 shows results of the image shape at the spot in Example 1.

Next, FIG. 11 shows the results of observing the image shape at the spot. The position in the horizontal direction indicates the focal position, with the left side of the diagram corresponding to underfocus and the right side of the diagram corresponding to overfocus. From FIG. 11, it is confirmed that the image shape is distorted in the Y axis direction because the image shape at the spot is elliptical.

Second Example

Figure 12:
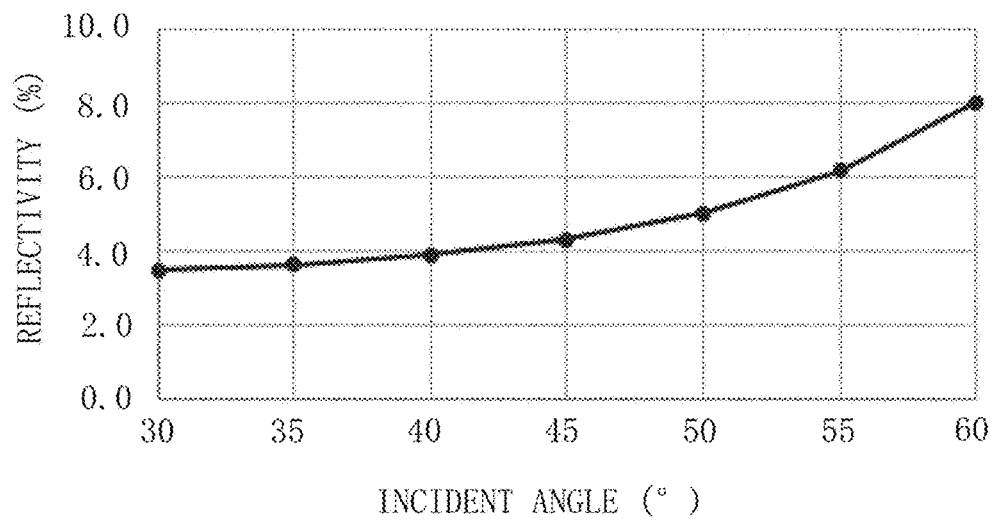
FIG. 12 shows the reflectivity characteristics of the beam splitter with respect to the incident angle.

In second example, the configuration of the light reduction mechanism 40 of the second embodiment 2 of the light reduction mechanism shown in FIG. 4, which is the second embodiment of the light reduction mechanism, is used. A laser beam having a wavelength of 1068 nm is used. The collective lens 22 having an annular shape conversion function is used so that the image shape at the spot is annular. The beam splitters used are the plate-type first beam splitter 41 and the plate-type second beam splitter 42, each of which has a thickness of 3 mm and has the reflectivity characteristics shown in FIG. 12 with relatively large incident angle dependence without an optical thin film formed on the surface of the plate. The horizontal axis indicates the incident angle (°) of the laser beam to the beam splitter, and the vertical axis indicates the reflectivity (%) of the laser beam. The first beam splitter 41 is arranged with the X axis as a rotation axis and inclined at an angle of 45°, and the second beam splitter 42 is arranged with the X' axis as a rotation axis and inclined at an angle of −45°.

Figure 13A:
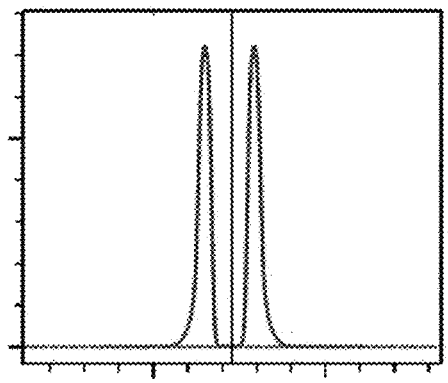
FIG. 13 shows results of measuring the energy intensity distribution in the image at the spot in Example
Figure 13B:
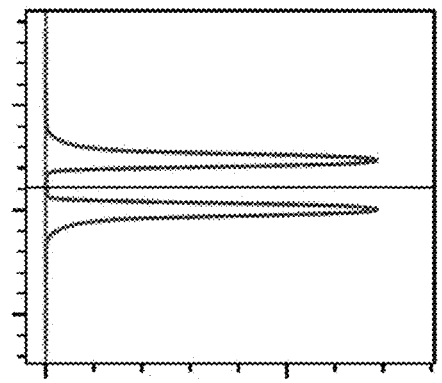

FIG. 13 shows the results of measuring the energy intensity distribution in the image at the spot in the present configuration. FIG. 13A shows the energy intensity distribution on the X axis of the image at the spot, in which the horizontal axis indicates the coordinate position of the X axis and the vertical axis indicates the energy intensity. FIG. 13B shows the energy intensity distribution on the Y axis of the image at the spot, in which the vertical axis indicates the coordinate position of the Y axis and the horizontal axis indicates the energy intensity. From FIG. 13, it is clear that the energy intensity distribution in the image shape obtained from the light reduction mechanism in Example 2 is in an unbiased state. In other words, it is confirmed that when the incident angle dependence of reflectivity is relatively large, it can be used in the configuration of the second embodiment of the light reduction mechanism.

Figure 14:
FIG. 14 shows results of the image shape at the spot in Example 2.

Next, FIG. 14 shows the results of observing the image shape at the spot. The position in the horizontal direction indicates the focal position, with the left side of the diagram corresponding to underfocus and the right side of the diagram corresponding to overfocus. From FIG. 14, it is confirmed that the image shape at the spot is circular and that the image shape is not distorted in the Y axis direction. This is because the second embodiment of the light reduction mechanism is a configuration that uses reflected light from the beam splitter and does not cause astigmatic differences due to astigmatism as in the case of transmitted light from the beam splitter.

Third Example

In a third example, the configuration of the light reduction mechanism 40 of the third embodiment 3 of the light reduction mechanism shown in FIG. 6, which is the third embodiment of the light reduction mechanism, is used. A laser beam having a wavelength of 1068 nm is used. The collective lens 22 having an annular shape conversion function is used so that the image shape at the spot is annular. The beam splitters used are the plate-type first beam splitter 41 and the plate-type second beam splitter 42, each of which has a thickness of 3 mm and has the transmittivity characteristics shown in FIG. 2. The first beam splitter 41 is arranged with the X axis as a rotation axis and inclined at an angle of 45°, and the second beam splitter 42 is arranged with the X' axis as a rotation axis and inclined at an angle of −45°. The beam splitter used is the plate-type total thickness beam splitter 45, which has a thickness of 6 mm and has the transmittivity characteristics shown in FIG. 7. The total thickness beam splitter 45 is arranged with the Y' axis as a rotation axis and inclined at an angle of 45°.

The thickness of 6 n for the total thickness beam splitter 45 is calculated using the aforementioned formula 1 under the following conditions:

$d_{41}$ is 3 mm,
$d_{42}$ is 3 mm,
$n_{45}$ is 1.44956 (wavelength 1068 nm),
$n_{41}$ is 1.44956 (wavelength 1068 nm),
$n_{42}$ is 1.44956 (wavelength 1068 nm),
$\alpha$ is 45',
$\beta$ is 45°.

FIG. 15 shows the results of measuring the energy intensity distribution in the image at the spot in the present configuration. FIG. 15A shows the energy intensity distribution on the X axis of the image at the spot, in which the horizontal axis indicates the coordinate position of the X axis and the vertical axis indicates the energy intensity. FIG. 15B shows the energy intensity distribution on the Y axis of the image at the spot, in which the vertical axis indicates the coordinate position of the Y axis and the horizontal axis indicates the energy intensity. From FIG. 15, it is clear that the energy intensity distribution in the image shape obtained from the light reduction mechanism in Example 3 is in an unbiased state.

Next, FIG. 16 shows the results of observing the image shape at the spot. The position in the horizontal direction indicates the focal position, with the left side of the diagram corresponding to underfocus and the right side of the diagram corresponding to overfocus. From FIG. 16, it is confirmed that the image shape at the spot is circular and that the image shape is not distorted in the Y axis direction. This is because the astigmatic difference, which is the difference of the focal length caused by astigmatism of the total thickness beam splitter 45, is equal to the total astigmatism difference caused by astigmatism of each of the first beam splitter 41 and the second beam splitter 42.

Fourth Example

In a fourth example, the same configuration as in Example 3 is used, except that the first beam splitter 41 and the second beam splitter 42 each have a thickness of 7.459 mm, and the first beam splitter 41 is arranged with the X axis as a rotation axis and inclined at an angle of 30°, and the second beam splitter 42 is arranged with the X' axis as a rotation axis and inclined at an angle of −30°.

The thicknesses of 7.459 mm for the first beam splitter 41 and the second beam splitter 42 are calculated using the aforementioned Formula 1, with $d_{41}=d_{42}$, under the following conditions:

$d_{45}$ is 6 mm,
$n_{45}$ is 1.44956 (wavelength 1068 nm),
$n_{41}$ is 1.44956 (wavelength 1068 nm),
$n_{42}$ is 1.44956 (wavelength 1068 nm),
α is 30°,
β is 45°.

FIG. 17 shows the results of measuring the energy intensity distribution in the image at the spot in the present configuration. FIG. 17A shows the energy intensity distribution on the X axis of the image at the spot, in which the horizontal axis indicates the coordinate position of the X axis and the vertical axis indicates the energy intensity. FIG. 17B shows the energy intensity distribution on the Y axis of the image at the spot, in which the vertical axis indicates the coordinate position of the Y axis and the horizontal axis indicates the energy intensity. From FIG. 17, it is clear that the energy intensity distribution in the image shape obtained from the light reduction mechanism in Example 4 is in an unbiased state.

Next, FIG. 18 shows the results of observing the image shape at the spot. The position in the horizontal direction indicates the focal position, with the left side of the diagram corresponding to underfocus and the right side of the diagram corresponding to overfocus. From FIG. 18, it is confirmed that the image shape at the spot is circular and that the image shape is not distorted in the Y axis direction. This is because the astigmatic difference, which is the difference of the focal length caused by astigmatism of the total thickness beam splitter 45, is equal to the total astigmatism difference caused by astigmatism of each of the first beam splitter 41 and the second beam splitter 42.

Fifth Example

In fifth example, the configuration of the light reduction mechanism 40 of the fourth embodiment 4 of the light reduction mechanism shown in FIG. 9, which is the fourth embodiment of the light reduction mechanism, is used. A laser beam having a wavelength of 1068 nm is used. The collective lens 22 having an annular shape conversion function is used so that the image shape at the spot is annular. The beam splitters used are the plate-type first beam splitter 41 and the plate-type second beam splitter 42 and the third beam splitter 46 and the fourth beam splitter 47, each of which has a thickness of 3 mm and has the transmittivity characteristics shown in FIG. 2. The first beam splitter 41 is arranged with the X axis as a rotation axis and inclined at an angle of 45°, and the second beam splitter 42 is arranged with the X' axis as a rotation axis and inclined at an angle of −45°. The third beam splitter 46 is arranged with the Y" axis as a rotation axis and inclined at an angle of 45°, and the fourth beam splitter 47 is arranged with the Y''' axis as a rotation axis and inclined at an angle of −45°.

The thicknesses of 3 mm for the third beam splitter 46 and the fourth beam splitter 47 are calculated using the aforementioned formula 2, with $d_{46}=d_{47}$, under the following conditions:

$d_{41}$ is 3 mm,
$d_{42}$ is 3 mm,
$n_{46}$ is 1.44956 (wavelength 1068 nm),
$n_{47}$ is 1.44956 (wavelength 1068 nm),
$n_{41}$ is 1.44956 (wavelength 1068 nm),
$n_{42}$ is 1.44956 (wavelength 1068 nm),
α is 45°,
β is 45°.

FIG. 19 shows the results of measuring the energy intensity distribution in the image at the spot in the present configuration. FIG. 19A shows the energy intensity distribution on the X axis of the image at the spot, in which the horizontal axis indicates the coordinate position of the X axis and the vertical axis indicates the energy intensity. FIG. 19B shows the energy intensity distribution on the Y axis of the image at the spot, in which the vertical axis indicates the coordinate position of the Y axis and the horizontal axis indicates the energy intensity. From FIG. 19, it is clear that the energy intensity distribution in the image shape obtained from the light reduction mechanism in Example 5 is in an unbiased state.

Next, FIG. 20 shows the results of observing the image shape at the spot. The position in the horizontal direction indicates the focal position, with the left side of the diagram corresponding to underfocus and the right side of the diagram corresponding to overfocus. From FIG. 20, it is confirmed that the image shape at the spot is circular. This is because the total astigmatic difference which is the difference in focal length caused by astigmatism of each of the third beam splitter 46 and the fourth beam splitter 47, is equal to the total astigmatic difference caused by astigmatism of each of the first beam splitter 41 and the second beam splitter 42.

Comparative Example

In the comparative example, a configuration is used which includes a laser beam irradiation optical unit having a collimation lens and a collective lens, and a plate-type beam splitter, arranged in order from the light source side. A laser beam having a wavelength of 1068 nm is used. The collective lens having an annular shape conversion function is used so that the image shape at the spot is annular. The beam splitter used is the plate-type beam splitter, which is the light reduction mechanism of the comparative example, has a thickness of 3 mm, and has the transmittivity characteristics shown in FIG. 2. The beam splitter is arranged with the X axis as the rotation axis and inclined at an angle of 45°. In other words, in the comparative example, only one beam splitter is used as the light reduction mechanism, and transmitted light is observed.

FIG. 21 shows the results of measuring the energy intensity distribution in the image at the spot in the present configuration. FIG. 21A shows the energy intensity distribution on the X axis of the image at the spot, in which the horizontal axis indicates the coordinate position of the X axis and the vertical axis indicates the energy intensity. FIG. 21B shows the energy intensity distribution on the Y axis of the image at the spot, in which the vertical axis indicates the coordinate position of the Y axis and the horizontal axis indicates the energy intensity. From FIG. 21B, it is clear that the energy intensity distribution in the image shape obtained from the light reduction mechanism in the comparative example is highly biased in the Y axis direction.

Next, FIG. 22 shows the results of observing the image shape at the spot. It is confirmed from FIG. 22 that the image shape at the spot is elliptical. This also reveals that the image shape of the comparative example is distorted in the Y axis direction. The shading of the image shape in FIG. 22 indicates that the darker areas have higher energy intensity and the lighter areas have lower energy intensity.

INDUSTRIAL APPLICABILITY

The light reduction mechanism that reduces the laser beam irradiated from a laser beam irradiation optical unit according to the present invention can reduce the laser beam to an extent not to damage a device that acquires image data, such as an image sensor or camera, and can measure the image shape and the energy intensity distribution of the laser beam at the spot when the energy intensity of the laser beam is high. Even in a case of the collected light having different incident angles depending on the incident position, the light reduction mechanism can reduce the energy intensity of the laser beam and output the reduced laser beam from the light reduction mechanism without biasing the energy intensity distribution of the incident light. In other words, the light reduction mechanism that reduces the laser beam irradiated from the laser beam irradiation optical unit according to the present invention is applicable in a case where the observation device is used to measure the image shape of the laser beam at the spot and the energy intensity distribution of the laser beam at the spot in the laser processing device that processes the workpiece to be processed by irradiating the laser beam.

What is claimed is:

1. A light reduction mechanism reducing a laser beam irradiated from a laser beam irradiation optical unit for laser processing by irradiating the laser beam to form a spot on a workpiece to be processed, the light reduction mechanism comprising:
a first beam splitter and a second beam splitter which are a plate-type, wherein
in a case where an X axis and a Y axis are arbitrary orthogonal coordinate axes in a plane perpendicular to an optical axis of the laser beam irradiation optical unit whose origin is in the optical axis, the first beam splitter is arranged with the X axis as a rotation axis and inclined at an angle $\alpha$ in a range of 30° or more and 60° or less with respect to a plane perpendicular to the optical axis, and the second beam splitter is arranged with an X' axis, which is parallel to the X axis and passes through the optical axis, as a rotation axis, and inclined at an angle $-\alpha$ with respect to a plane perpendicular to the optical axis.

2. The light reduction mechanism according to claim 1, wherein
the first beam splitter and the second beam splitter have a transmittivity of 0.1% or more and 5.0% or less at an incident angle of 45° of the laser beam, or a reflectivity of 0.1% or more and 5.0% or less at an incident angle of 45° of the laser beam.

3. The light reduction mechanism according to claim 1, comprising:

an observation device that reads information relating to an energy intensity distribution of the laser beam that forms an image at a position of the spot; and
a calculation device that performs a numerical calculation of output data from the observation device for correction.

4. The light reduction mechanism according to claim 1, comprising:
a total thickness beam splitter which is a plate-type and has a transmittivity of 0.1% or more and 50.0% or less at an incident angle of 45° of the laser beam, wherein
the total thickness beam splitter is arranged with a Y' axis, which is parallel to the Y axis and passes through the optical axis, as a rotation axis and inclined at an angle $\beta$ or angle $-\beta$ in a range of 30° or more and 60° or less with respect to a plane perpendicular to the optical axis, and
following conditions are satisfied:

$$d_{45}(n_{45}^2 - 1)\frac{\sin^2\beta}{\sqrt{(n_{45}^2 - \sin^2\beta)^3}} = \quad \text{(Formula 1)}$$

$$d_{41}(n_{41}^2 - 1)\frac{\sin^2\alpha}{\sqrt{n_{41}^2 - \sin^2\alpha)^3}} + d_{42}(n_{42}^2 - 1)\frac{\sin^2\alpha}{\sqrt{(n_{42}^2 - \sin^2\alpha)^3}}$$

Here,
$d_{45}$ is a thickness of a plate of the total thickness beam splitter,
$d_{41}$ is a thickness of a plate of the first beam splitter,
$d_{42}$ is a thickness of a plate of the second beam splitter,
$n_{45}$ is a refractive index of an optical material of the total thickness beam splitter,
$n_{41}$ is a refractive index of an optical material of the first beam splitter, and
$n_{42}$ is a refractive index of an optical material of the second beam splitter.

5. The light reduction mechanism according to claim 1, comprising:
a third beam splitter and a fourth beam splitter which are a plate-type, wherein
the third beam splitter is arranged with a Y" axis, which is parallel to the Y axis and passes through the optical axis, as a rotation axis and inclined at an angle $\beta$ in a range of 30° or more and 60° or less with respect to a plane perpendicular to the optical axis, and the fourth beam splitter is arranged with a Y''' axis, which is parallel to the Y axis and passes through the optical axis, as a rotation axis and inclined at an angle $-\beta$ with respect to a plane perpendicular to the optical axis, and
following conditions are satisfied:

$$d_{46}(n_{46}^2 - 1)\frac{\sin^2\beta}{\sqrt{(n_{46}^2 - \sin^2\beta)^3}} + d_{47}(n_{47}^2 - 1)\frac{\sin^2\beta}{\sqrt{n_{47}^2 - \sin^2\beta)^3}} = \quad \text{(Formula 2)}$$

$$d_{41}(n_{41}^2 - 1)\frac{\sin^2\alpha}{\sqrt{n_{41}^2 - \sin^2\alpha)^3}} + d_{42}(n_{42}^2 - 1)\frac{\sin^2\alpha}{\sqrt{(n_{42}^2 - \sin^2\alpha)^3}}$$

Here,
$d_{46}$ is a thickness of a plate of the third beam splitter,
$d_{47}$ is a thickness of a plate of the fourth beam splitter,
$d_{41}$ is a thickness of a plate of the first beam splitter,
$d_{42}$ is a thickness of a plate of the second beam splitter, $n_{46}$ is a refractive index of an optical material of the third beam splitter, $n_{47}$ is a refractive index of an optical material of the fourth beam splitter, $n_{41}$ is a refractive index of an optical material of the first beam splitter, and $n_{42}$ is a refractive index of an optical material of the second beam splitter.

6. The light reduction mechanism according to claim 5, wherein the third beam splitter and the fourth beam splitter have a transmittivity of 0.1% or more and 5.0% or less at an incident angle of 45° of the laser beam.

7. The light reduction mechanism according to claim 1, wherein the laser beam irradiation optical unit includes a collimation lens for making the laser beam into parallel light and a collective lens for collecting the laser beam.

8. An output data correction method performing correction by numerically calculating output data from an observation device of the light reduction mechanism according to claim 3, wherein a numerical calculation is performed to correct a coordinate position of the output data in a Y axis direction.

9. A laser beam measurement device comprising the light reduction mechanism according to claim 1.

* * * * *